(12) United States Patent
Kim et al.

(10) Patent No.: US 12,400,292 B2
(45) Date of Patent: *Aug. 26, 2025

(54) APPARATUS AND METHOD FOR PERFORMING ARTIFICIAL INTELLIGENCE ENCODING AND ARTIFICIAL INTELLIGENCE DECODING ON IMAGE BY USING PRE-PROCESSING

(71) Applicant: SAMSUNG ELECTRONICS CO., LTD., Suwon-si (KR)

(72) Inventors: Jaehwan Kim, Suwon-si (KR); Youngo Park, Suwon-si (KR); Heechul Yang, Suwon-si (KR); Chaeeun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 837 days.

This patent is subject to a terminal disclaimer.

(21) Appl. No.: 17/500,672

(22) Filed: Oct. 13, 2021

(65) Prior Publication Data
US 2022/0036508 A1  Feb. 3, 2022

Related U.S. Application Data

(63) Continuation of application No. 17/184,250, filed on Feb. 24, 2021, now Pat. No. 11,182,876.

(30) Foreign Application Priority Data

Feb. 24, 2020 (KR) .......................... 10-2020-0022379

(51) Int. Cl.
*G06T 3/4046* (2024.01)
*G06T 9/00* (2006.01)
(52) U.S. Cl.
CPC .............. *G06T 3/4046* (2013.01); *G06T 9/00* (2013.01)

(58) Field of Classification Search
CPC ................................ G06T 3/4046; G06T 9/00
See application file for complete search history.

(56) References Cited

U.S. PATENT DOCUMENTS 7,308,031 B2  12/2007 Yamaguchi et al.
8,385,406 B2   2/2013 Cho et al.
(Continued)

FOREIGN PATENT DOCUMENTS

CN  101878649 A  11/2010
CN  104754357 A   7/2015
(Continued)

OTHER PUBLICATIONS

Communication dated Jan. 14, 2021 issued by the Korean Patent Office in application No. 10-2020-7000378.
(Continued)

*Primary Examiner* — Charles T Shedrick
(74) *Attorney, Agent, or Firm* — Sughrue Mion, PLLC

(57) ABSTRACT

An artificial intelligence (AI) decoding apparatus includes a memory storing one or more instructions; and a processor configured to execute the one or more instructions to obtain image data generated through first encoding on a first image; obtain a second image corresponding to the first image by performing first decoding on the image data; perform pre-processing of changing a resolution of the second image, according to a pre-determined output resolution; and obtain a fourth image having the pre-determined output resolution by applying AI up-scaling based on an up-scaling deep neural network (DNN) to a third image obtained as a result of the pre-processing.

10 Claims, 16 Drawing Sheets

(56) References Cited

U.S. PATENT DOCUMENTS

| | | |
|---|---|---|
| 9,602,814 B2 | 3/2017 | Bhagavathy et al. |
| 9,679,213 B2 | 6/2017 | Yang et al. |
| 9,749,580 B2 | 8/2017 | Suh et al. |
| 9,936,208 B1 | 4/2018 | Brailovskiy et al. |
| 10,148,723 B2 | 12/2018 | Falvo |
| 10,218,971 B2 | 2/2019 | Dong et al. |
| 10,225,607 B1 | 3/2019 | Bai et al. |
| 10,423,843 B2* | 9/2019 | Biemer ............ G06V 20/63 |
| 10,623,775 B1 | 4/2020 | Theis et al. |
| 10,817,989 B2 | 10/2020 | Kim et al. |
| 10,817,990 B1* | 10/2020 | Yang ............ G06T 3/4053 |
| 10,825,141 B1* | 11/2020 | Park ............ G06T 9/002 |
| 10,832,447 B2 | 11/2020 | Jeon et al. |
| 10,950,009 B2 | 3/2021 | Dinh et al. |
| 10,986,356 B2 | 4/2021 | Kim et al. |
| 2005/0129306 A1 | 6/2005 | Wang et al. |
| 2005/0195900 A1 | 9/2005 | Han |
| 2007/0189392 A1 | 8/2007 | Tourapis et al. |
| 2008/0140594 A1 | 6/2008 | Tannhof et al. |
| 2009/0141809 A1 | 6/2009 | Visharam et al. |
| 2009/0148054 A1 | 6/2009 | Kim et al. |
| 2011/0026819 A1 | 2/2011 | Lee |
| 2011/0090950 A1 | 4/2011 | Bush et al. |
| 2012/0026288 A1 | 2/2012 | Tourapis et al. |
| 2012/0275511 A1 | 11/2012 | Shemer et al. |
| 2014/0037015 A1 | 2/2014 | Ye et al. |
| 2014/0177706 A1 | 6/2014 | Fernandes et al. |
| 2014/0247890 A1 | 9/2014 | Yamaguchi et al. |
| 2015/0042878 A1 | 2/2015 | Jeon et al. |
| 2015/0256828 A1 | 9/2015 | Dong et al. |
| 2015/0334416 A1 | 11/2015 | Holcomb et al. |
| 2015/0371132 A1* | 12/2015 | Gemello ............ H01L 29/785 706/20 |
| 2016/0323583 A1 | 11/2016 | Kadoto et al. |
| 2016/0328630 A1 | 11/2016 | Han et al. |
| 2016/0360155 A1 | 12/2016 | Civanlar et al. |
| 2017/0039456 A1 | 2/2017 | Saberian et al. |
| 2017/0208345 A1 | 7/2017 | Jeong et al. |
| 2017/0287109 A1 | 10/2017 | Tasfi |
| 2017/0344808 A1* | 11/2017 | El-Khamy ............ G06T 7/70 |
| 2017/0345130 A1 | 11/2017 | Wang et al. |
| 2017/0347061 A1* | 11/2017 | Wang ............ G06N 3/04 |
| 2017/0347110 A1 | 11/2017 | Wang et al. |
| 2017/0357871 A1 | 12/2017 | Zhai et al. |
| 2018/0014022 A1 | 1/2018 | Cho et al. |
| 2018/0063549 A1 | 3/2018 | Amer et al. |
| 2018/0075343 A1* | 3/2018 | van den Oord ......... G06F 40/44 |
| 2018/0107925 A1 | 4/2018 | Choi et al. |
| 2018/0131953 A1 | 5/2018 | Wang et al. |
| 2018/0139458 A1* | 5/2018 | Wang ............ G06T 3/4053 |
| 2018/0174275 A1 | 6/2018 | Bourdev et al. |
| 2018/0176576 A1 | 6/2018 | Rippel et al. |
| 2018/0239972 A1* | 8/2018 | Biemer ............ G06V 20/582 |
| 2018/0249158 A1 | 8/2018 | Huang et al. |
| 2018/0293706 A1 | 10/2018 | Viswanathan et al. |
| 2018/0302456 A1 | 10/2018 | Katsavounidis et al. |
| 2018/0352233 A1 | 12/2018 | Alshina et al. |
| 2019/0013822 A1 | 1/2019 | Marpe et al. |
| 2019/0075301 A1 | 3/2019 | Chou et al. |
| 2019/0147296 A1 | 5/2019 | Wang et al. |
| 2019/0166379 A1 | 5/2019 | Navarrete Michelini et al. |
| 2019/0180189 A1 | 6/2019 | Biesemann et al. |
| 2019/0230354 A1 | 7/2019 | Kim |
| 2020/0053408 A1 | 2/2020 | Park et al. |
| 2020/0126186 A1* | 4/2020 | Kim ............ G06N 3/084 |
| 2020/0143194 A1 | 5/2020 | Hou et al. |
| 2020/0162751 A1 | 5/2020 | Kim et al. |
| 2020/0162789 A1 | 5/2020 | Ma et al. |
| 2020/0184685 A1* | 6/2020 | Kim ............ H04N 19/59 |
| 2020/0193647 A1* | 6/2020 | Jeon ............ G06T 5/70 |
| 2020/0258197 A1 | 8/2020 | Tai et al. |
| 2020/0382792 A1 | 12/2020 | Gao et al. |
| 2020/0382793 A1 | 12/2020 | Gao et al. |
| 2021/0073947 A1* | 3/2021 | Park ............ G06N 3/045 |
| 2021/0125380 A1* | 4/2021 | Lee ............ H04N 19/117 |
| 2021/0160556 A1 | 5/2021 | Jang |

FOREIGN PATENT DOCUMENTS

| | | |
|---|---|---|
| CN | 104902273 A | 9/2015 |
| CN | 107431805 A | 12/2017 |
| JP | 2009-540625 A | 11/2009 |
| KR | 100286443 B1 | 4/2001 |
| KR | 100657280 B1 | 12/2006 |
| KR | 101375663 B1 | 4/2014 |
| KR | 101425602 B1 | 7/2014 |
| KR | 1020140145560 A | 12/2014 |
| KR | 1020150041098 A | 4/2015 |
| KR | 1020150060906 A | 6/2015 |
| KR | 10-2015-0087103 A | 7/2015 |
| KR | 10-2015-0135637 A | 12/2015 |
| KR | 1020160131848 A | 11/2016 |
| KR | 1020160132331 A | 11/2016 |
| KR | 1020170059040 A | 5/2017 |
| KR | 1020170100045 A | 9/2017 |
| KR | 1020180001428 A | 1/2018 |
| KR | 1020180043154 A | 4/2018 |
| KR | 1020180052651 A | 5/2018 |
| KR | 101885855 B1 | 8/2018 |
| KR | 1020180100976 A | 9/2018 |
| KR | 1020180108288 A | 10/2018 |
| KR | 102022648 B1 | 9/2019 |
| KR | 10-2019-0130479 A | 11/2019 |
| KR | 10-2020-0009118 A | 1/2020 |
| KR | 1020200016943 A | 2/2020 |
| KR | 1020200044661 A | 4/2020 |
| WO | 2012058394 A1 | 5/2012 |
| WO | 2015/104963 A1 | 7/2015 |
| WO | 2016132148 A1 | 8/2016 |
| WO | 2016132152 A1 | 8/2016 |
| WO | WO-2016132145 A1 * | 8/2016 ............ G06K 9/46 |
| WO | 2017036370 A1 | 3/2017 |
| WO | WO-2017144881 A1 * | 8/2017 ............ G06T 3/4053 |
| WO | 2019220095 A1 | 11/2019 |
| WO | WO-2020080709 A1 * | 4/2020 ............ G06N 3/04 |
| WO | WO-2020080765 A1 * | 4/2020 ............ G06N 20/10 |

OTHER PUBLICATIONS

Communication dated Aug. 19, 2019 issued by the European Patent Office in application No. 19183429.0.
Tao, W., et al., "An End-to-End Compression Framework Based on Convolutional Neural Networks", 2017 Data Compression Conference, IEEE, 2017, p. 463.
Theis, L., et al., "Lossy Image Compression With Compressive Autoencoders", ICLR 2017, arXiv:1703.00395v1 [stat.ML] Mar. 1, 2017, pp. 1-19.
Jiang, F., et al., "An End-to-End Compression Framework Based on Convolutional Neural Networks", IEEE Transactions on Circuits and Systems for Video Technology, arXiv:1708.00838v1 [cs.CV] Aug. 2, 2017, pp. 1-13.
Nguyen, V.-A., et al., "Adaptive Downsampling/Upsampling for Better Video Compression at Low Bit Rate", IEEE 2008, pp. 1624-1627.
Communication dated Apr. 28, 2020 issued by the European Patent Office in application No. 19183429.0.
Yahia, H., "Frame Interpolation using Convolutional Neural Networks on 2D animation", Universiteit Van Amsterdam Bachelor Thesis, Jun. 24, 2016, XP055558906.
Skoneczny, S., et al., "Classical and neural methods of image sequence interpolation", SPIE—International Society for Optical Engineering Proceedings, vol. 4535, Aug. 24, 2001, XP055688092, pp. 190-204.
Communication dated Dec. 11, 2020 issued by the European Patent Office in application No. 19183429.0.
International Search Report & Written Opinion (PCT/ISA/210 & PCT/ISA/237) dated Aug. 6, 2019 issued by the International Searching Authority in International Application No. PCT/KR2019/004171.

(56) References Cited

OTHER PUBLICATIONS

International Search Report & Written Opinion (PCT/ISA/210 and PCT/ISA9237) dated Dec. 4, 2019 issued by the International Searching Authority in International Application No. PCT/KR2019/010645.
Communication dated Dec. 16, 2020 issued by the Korean Patent Office in application No. 10-2019-0062583.
Cho, S., et al., "A Technical Analysis on Deep Learning based Image and Video Compression", Journal of Broadcast Engineering Society, Korean Institute of Broadcast and Media Engineers, May 2018, pp. 383-394.
Johnston, N., et al., "Improved Lossy Image Compression with Priming and Spatially Adaptive Bit Rates for Recurrent Networks", Cornell University, Mar. 29, 2017, 9 pages.
Communication dated Dec. 22, 2020 issued by the Korean Patent Office in application No. 10-2019-0066057.
International Search Report & Written Opinion (PCT/ISA/210 and PCT/ISA237) dated Jan. 30, 2020 issued by the International Searching Authority in International Application No. PCT/KR2019/013421.
Nick Johnston et al., "Improved Lossy Image Compression with Priming and Spatially Adaptive Bit Rates for Recurrent Networks", Proceedings of the IEEE Conference on CVPR, Computer Vision Foundation, Jun. 23, 2018, pp. 4385-4393, 9 total pages.
Li et al., "Learning a Convolutional Neural Network for Image Compact-Resolution," IEEE Transactions on Image Processing, vol. 28, No. 3, pp. 1092-1107, Mar. 2019, XP011703593.
Li et al., "Convolutional Neural Network-Based Block Up-Sampling for Intra Frame Coding," IEEE Transactions on Circuits and Systems for Video Technology, vol. 28, No. 9, pp. 2316-2330, Sep. 2018, XP055610817.
Communication dated Jun. 1, 2021, issued by the International Searching Authority in counterpart International Application No. PCT/KR2021/002204 (PCT/ISA/220, 210, 237).
Communication dated Jul. 27, 2021, issued by the Korean Patent Office in counterpart Korean Patent Application No. 10-2020-22379.
Communication dated Jun. 7, 2021, issued by the India Intellectual Property Office in Indian Patent Application No. 201924041670.
Communication dated Aug. 9, 2021, issued by the Korean Patent Office in counterpart Korean Patent Application No. 10-2019-0062583.
Communication dated Apr. 27, 2021 issued by the Korean Intellectual Property Office in application No. 10-2020-0022379.
Communication dated Mar. 8, 2021 issued by the Intellectual Property India Patent Office in application No. 201927038419.
Communication dated Jun. 21, 2021, issued by the Korean Patent Office in counterpart Korean Patent Application No. 10-2019-0062583.
Communication dated Jun. 21, 2021, issued by the Korean Patent Office in counterpart Korean Patent Application No. 10-2019-0066057.
Communication dated Aug. 9, 2021, issued by the Korean Patent Office in counterpart Korean Patent Application No. 10-2019-0066057.
Communication dated Jun. 29, 2021, issued by the European Patent Office in counterpart European Application No. 19872393.4.
Kim, H., et al., "Task-Aware Image Downscaling", Computer Vision-ECCV 2018, Oct. 6, 2018, pp. 1-16.
Park, W.-S., et al., "CNN-Based In-Loop Filtering For Coding Efficiency Improvement", IEEE, 2016, 5 pages.
Dai, Y., et al., "A Convolutional Neural Network Approach for Post-Processing in HEVC Intra Coding", arXiv:1608.06690v2 [cs.MM] Oct. 29, 2016, 12 pages.
Rastegari, M., et al., "XNOR-Net: ImageNet Classification Using Binary Convolutional Neural Networks", Allen Institute for AI, University of Washington, 17 pages, Sep. 17, 2016.
Courbariaux, M., et al., "BinaryConnect: Training Deep Neural Networks with binary weights during propagations", 1 arXiv:1511.00363v3 [cs.LG] Apr. 18, 2016, pp. 1-9.

International Search Report & Written Opinion (PCT/ISA/210 and PCT/ISA/237) dated Apr. 5, 2018 issued by the International Searching Authority in International Application No. PCT/KR2017/007258.
International Search Report & Written Opinion (PCT/ISA/210 and PCT/ISA/237) dated Jul. 11, 2018 issued by the International Searching Authority in International Application No. PCT/KR2018/001542.
Mao, X.J., et al., "Image Restoration Using Convolutional Auto-encoders with Symmetric Skip Connections", arXiv:1606.08921v3 [cs.CV] Aug. 30, 2016, Corne II University Library, pp. 1-17.
Communication dated Oct. 4, 2021, issued by the European Patent Office in counterpart European Application No. 19873223.2.
Sajjadi et al., "EnhanceNet: Single Image Super-Resolution Through Automated Texture Synthesis," 2017 IEEE International Conference on Computer Vision, pp. 4501-4510, Oct. 2017, XP033283324.
Guo et al., "Deep Learning Based Image Super-Resolution With Coupled Backpropagation," 2016 IEEE Global Conference on Signal and Information Processing (GlobalSIP 2016), pp. 237-241, Dec. 2016, XP033087061.
Communication dated Apr. 6, 2020 issued by the United States Patent and Trademark Office in U.S. Appl. No. 16/570,057.
Communication dated Oct. 23, 2019 issued by the United States Patent and Trademark Office in U.S. Appl. No. 16/570,057.
Kim, J., et al. "Dynamic frame resizing with convolutional neural network for efficient video compression." Applications of Digital Image Processing XL. vol. 10396. International Society for Optics and Photonics, 2017. (Year: 2017), pp. 103961R-1-103961R-13 (14 pages).
Afonso, M., et al. "Spatial resolution adaptation framework for video compression." Applications of Digital Image Processing XU. vol. 10752. International Society for Optics and Photonics, 2018. (Year: 2018), pp. 107520L-1-107520L-10 (11 pages).
"several, adj., adv. and n." OED Online, Oxford University Press, Mar. 2020, oed.com/view/Entry/176914. Accessed Mar. 27, 2020. (Year: 2020), pp. 1-21.
Gorodilov, A., et al., "Neural Networks for Image and Video Compression." 2018 International Conference on Artificial Intelligence Applications and Innovations (IC-AIAI). IEEE. (Year: 2018), pp. 37-41.
Zhang, X., et al., "Can lower resolution be better?." Data Compression Conference (Dec. 2008). IEEE, 2008. (Year: 2008), pp. 302-311.
Communication dated Mar. 24, 2020 issued by the United States Patent and Trademark Office in U.S. Appl. No. 16/793,605.
Cai, B., et al., "Deep Sampling Networks", arXiv:1712.00926v2 (2018), pp. 1-17.
Communication dated Jun. 29, 2020 issued by the United States Patent and Trademark Office in U.S. Appl. No. 16/821,609.
Chen, H., et al., "Low bit rates image compression via adaptive block downsampling and super resolution", Journal of Electronic Imaging, vol. 25, No. 1, Jan./Feb. 2016, pp. 013004-1-013004-10 (11 pages).
Hosking, B., et al., "An Adaptive Resolution Rate Control Method For INTRA Coding in HEVC", 2016 IEEE International Conference on Acoustics, Speech and Signal Processing (ICASSP), pp. 1486-1490.
Hou, X., et al., "Learning Based Image Transformation Using Convolutional Neural Networks", IEEE Access, vol. 6, 2018, pp. 49779-49792.
Communication dated Aug. 24, 2020 issued by the United States Patent and Trademark Office in U.S. Appl. No. 16/821,686.
Colic, A., et al., "Exploring NVIDIA-CUDA for Video Coding", Proceedings of the first annual ACM SIGMM Conference on Multimedia systems, 2010, pp. 13-22.
Communication dated Apr. 27, 2020 issued by the United States Patent and Trademark Office in U.S. Appl. No. 16/821,686.
Deshpande, A., "A Beginner's Guide to Understanding Convolutional Neural Networks", https://adeshpande3.github.io/A-Beginner%27s-Guide-To-Understanding-Convolutional-Neural-Networks, Jul. 20, 2016, pp. 1/31-17/31.
Communication dated Nov. 5, 2020 issued by the United States Patent and Trademark Office in U.S. Appl. No. 16/821,686.

(56) References Cited

OTHER PUBLICATIONS

Communication dated Feb. 17, 2021 issued by the United States Patent and Trademark Office in U.S. Appl. No. 17/082,848.
Communication dated Sep. 29, 2022 issued by the United States Patent and Trademark Office in U.S. Appl. No. 17/383,533.
Communication dated Oct. 16, 2020 issued by the United States Patent and Trademark Office in U.S. Appl. No. 16/468,338.
Communication dated Dec. 4, 2019 issued by the United States Patent and Trademark Office in U.S. Appl. No. 16/656,812.
Aklson, Alex. "Shallow Versus Deep Neural Networks." Introduction to Deep Learning & Neural Networks with Keras, Coursera. https://www.coursera.org/lecture/introduction-to-deep-learning-with-keras/shallow-versus-deep-neural-networks-3pKHn. Accessed Nov. 26, 2019. (Year: 2019).
Communication dated Jan. 12, 2021 issued by the United States Patent and Trademark Office in U.S. Appl. No. 17/079,773.
Communication dated Oct. 14, 2022 issued by the United States Patent and Trademark Office in U.S. Appl. No. 17/575,691.
Communication dated Mar. 13, 2020 issued by the United States Patent and Trademark Office in U.S. Appl. No. 16/781,083.
Communication dated Dec. 18, 2020 issued by the United States Patent and Trademark Office in U.S. Appl. No. 16/750,615.
Communication dated Aug. 17, 2020 issued by the United States Patent and Trademark Office in U.S. Appl. No. 16/750,615.
Communication dated Jul. 30, 2020 issued by the United States Patent and Trademark Office in U.S. Appl. No. 16/656,812.
Communication issued on Jun. 27, 2024 by the European Patent Office for EP Patent Application No. 19183429.0.
Communication issued on May 27, 2024 by the Indian Patent Office in corresponding IN Patent Application No. 201944042227.
Communication issued by the United States Patent and Trademark Office on Jan. 19, 2023 for U.S. Appl. No. 17/383,533.
Communication issued by the United States Patent and Trademark Office on Feb. 10, 2023 for U.S. Appl. No. 17/575,691.
Communication dated May 24, 2022, issued by the Korean Intellectual Property Office in Korean Patent Application No. 10-2021-0119183.
Communication dated Nov. 8, 2021 issued by the Korean Patent Office in counterpart Korean Application No. 10-2021-0119183.
Communication issued Sep. 20, 2023 by National Intellectual Property Administration, PRC in Chinese Application No. 201980068867.1.
Communication dated Feb. 21, 2022, issued by the Korean Intellectual Property Office in Korean Patent Application No. 10-2019-0066057.
Communication dated Jan. 12, 2022, issued by the China National Intellectual Property Administration in counterpart Chinese Application No. 201880013752.8.
Communication dated Feb. 22, 2024, issued by the National Intellectual Property Administration, PRC, in Chinese Application No. 201980061966.7.
Communication dated Aug. 29, 2022, issued by the Korean Intellectual Property Office in Korean Patent Application No. 10-2019-0062583.
Communication dated Sep. 22, 2022, issued by the Korean Intellectual Property Office in Korean Patent Application No. 10-2019-0062583.
Communication dated Aug. 25, 2022, issued by the National Intellectual Property Administration of P.R. China in counterpart Chinese Application No. 201880013752.8.
Communication issued Oct. 21, 2024 by the European Patent Office in European Patent Application No. 19872393.4.
Communication issued Oct. 28, 2024 by the European Patent Office for EP Patent Application No. 19183429.0.
Communication issued Sep. 4, 2024 by the European Patent Office for EP Patent Application No. 19183429.0.
Communication dated Dec. 19, 2024 issued by the European Patent Office in European Patent Application No. 19873223.2.
Communication issued Jun. 12, 2025 by the European Intellectual Property Office in counterpart European Patent Application No. 19873223.2.

* cited by examiner

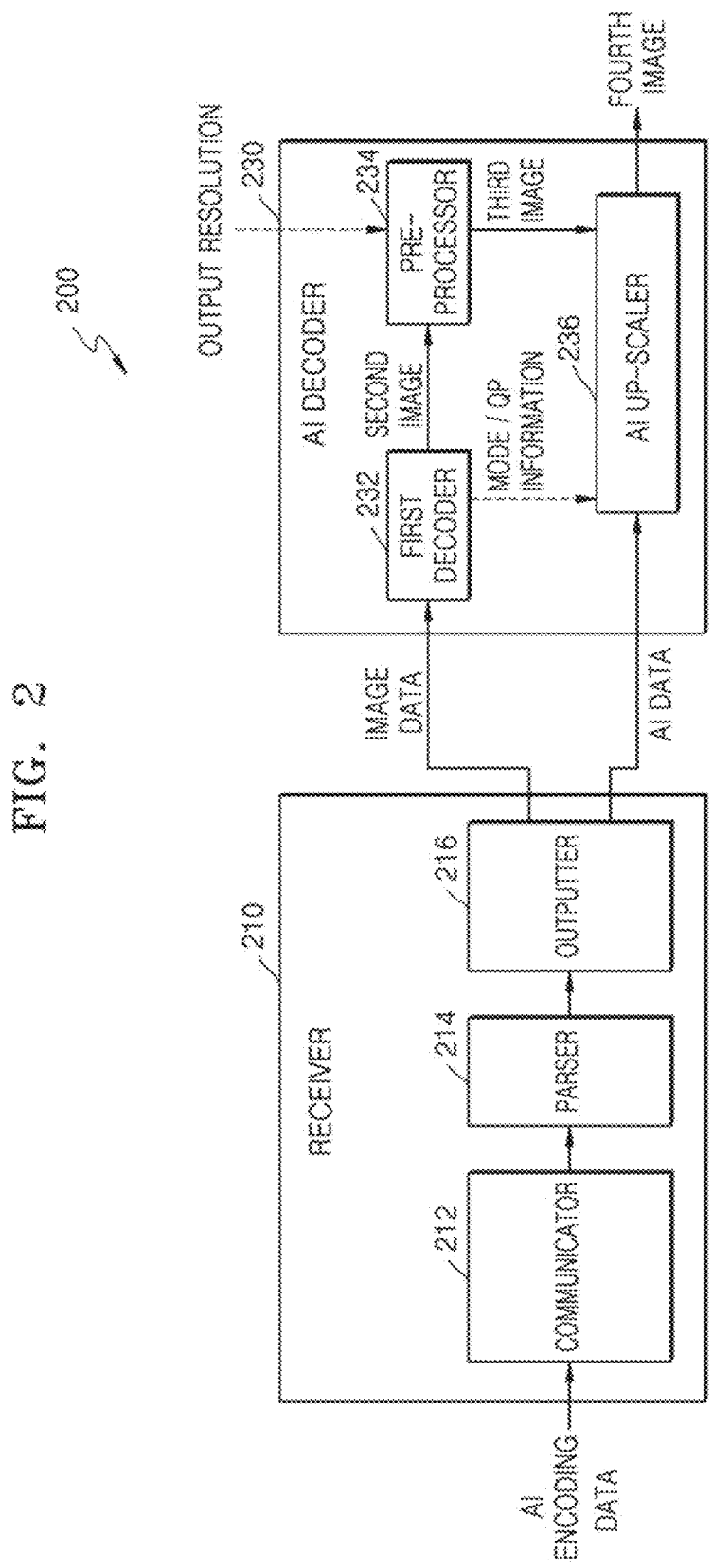

FIG. 5

| IMAGE-RELATED INFORMATION | DNN SETTING INFORMATION |
|---|---|
| SD, 10Mbps, AV1 | A DNN SETTING INFORMATION |
| HD, 15Mbps, H.264 | B DNN SETTING INFORMATION |
| Full HD, 20Mbps, HEVC | C DNN SETTING INFORMATION |
| Full HD, 15Mbps, HEVC | D DNN SETTING INFORMATION |

APPARATUS AND METHOD FOR PERFORMING ARTIFICIAL INTELLIGENCE ENCODING AND ARTIFICIAL INTELLIGENCE DECODING ON IMAGE BY USING PRE-PROCESSING

CROSS-REFERENCE TO RELATED APPLICATION

This application is a continuation of U.S. application Ser. No. 17/184,250 dated Feb. 24, 2021, which is based on and claims priority under 35 U.S.C. § 119 to Korean Patent Application No. 10-2020-0022379, filed on Feb. 24, 2020, in the Korean Intellectual Property Office, the disclosures of which are incorporated by reference herein in their entireties.

BACKGROUND

1. Field

The disclosure relates to image processing. More particularly, the disclosure relates to a method and apparatus for performing artificial intelligence (AI) encoding and AI decoding on an image.

2. Description of the Related Art

Images are encoded by a codec following a designated data compression standard, e.g., a moving picture expert group (MPEG) compression standard, and are then stored in a recording medium or are transmitted via a communication channel in the form of bit streams.

As hardware for reproducing and storing high-resolution/high-quality images is being developed and supplied, a need for a codec capable of effectively encoding and decoding high-resolution/high-quality images is increasing.

SUMMARY

Provided are an artificial intelligence (AI) encoding method based on pre-processing, an AI decoding method based on pre-processing, an AI encoding apparatus based on pre-processing, and an AI decoding apparatus based on pre-processing, in which an image is encoded and decoded based on AI to attain a low bitrate.

Additional aspects will be set forth in part in the description which follows and, in part, will be apparent from the description, or may be learned by practice of the presented embodiments of the disclosure.

According to an embodiment of the disclosure, an AI decoding apparatus includes a memory storing one or more instructions; and a processor configured to execute the one or more instructions stored in the memory, wherein the processor is configured to: obtain image data generated through first encoding on a first image; obtain a second image corresponding to the first image by performing first decoding on the image data; perform pre-processing of changing a resolution of the second image, according to a pre-determined output resolution; and obtain a fourth image having the pre-determined output resolution by applying AI up-scaling based on an up-scaling deep neural network (DNN) to a third image obtained as a result of the pre-processing.

The processor may be further configured to change the resolution of the second image via a legacy scaling method.

The processor may be further configured to: determine, as a target resolution of the third image, a value obtained by dividing the pre-determined output resolution by a scaling factor of the up-scaling DNN; and change the resolution of the second image to have the determined target resolution.

The processor may be further configured to: obtain AI data related to AI down-scaling of an original image to the first image; and select DNN setting information corresponding to the AI data from among a plurality of DNN setting information previously stored in the AI decoding apparatus. The up-scaling DNN may operate according to the selected DNN setting information.

The processor may be further configured to determine the output resolution according to performance information of a display that reproduces the fourth image.

According to another embodiment of the disclosure, an AI encoding apparatus includes a memory storing one or more instructions; and a processor configured to execute the one or more instructions stored in the memory, wherein the processor is configured to: perform pre-processing of changing a resolution of a first original image according to a pre-determined output resolution; obtain a first image having the pre-determined output resolution by applying AI down-scaling based on a down-scaling DNN to a second original image obtained as a result of the pre-processing; generate image data by performing first encoding on the first image; and transmit the image data.

The processor may be further configured to change the resolution of the first original image via a legacy scaling method.

The processor may be further configured to: determine, as a target resolution of the second original image, a value obtained by dividing the pre-determined output resolution by a scaling factor of the down-scaling DNN; and change the resolution of the first original image to have the determined target resolution.

The down-scaling DNN may be trained based on first quality loss information corresponding to a difference between a fourth training image obtained by performing AI up-scaling on an original training image through an up-scaling DNN and an enlarged training image obtained by performing legacy up-scaling on the original training image.

The down-scaling DNN may be trained based on second quality loss information corresponding to a difference between a first training image obtained by performing AI down-scaling on the fourth training image through the down-scaling DNN and the original training image.

The processor may be further configured to transmit AI data related to the AI down-scaling, and the AI data may be used to select DNN setting information to be set for an up-scaling DNN for AI up-scaling from among a plurality of DNN setting information previously stored in an AI decoding apparatus.

The processor may be further configured to determine the output resolution, based on performance information of a display that reproduces a second image obtained through first decoding on the image data.

The processor may be further configured to determine the output resolution, based on a scaling factor of an AI decoding apparatus that performs AI up-scaling on a second image obtained through first decoding on the image data and performance information of a display that reproduces a fourth image obtained through AI up-scaling on the second image.

The processor may be further configured to execute at least one of the one or more instructions to, when an AI decoding apparatus is able to perform pre-processing of changing resolution of a second image obtained through first decoding on the image data, determine the output resolution based on the state of a network that connects the AI encoding apparatus to the AI decoding apparatus.

According to another embodiment of the disclosure, an AI decoding method includes obtaining image data generated through first encoding on a first image; obtaining a second image corresponding to the first image by performing first decoding on the image data; performing pre-processing of changing resolution of the second image, according to a pre-determined output resolution; and obtaining a fourth image having the pre-determined output resolution by applying AI up-scaling based on an up-scaling DNN to a third image obtained as a result of the pre-processing.

According to another embodiment of the disclosure, an AI encoding method includes performing pre-processing of changing resolution of a first original image according to a pre-determined output resolution; obtaining a first image having the pre-determined output resolution by applying AI down-scaling based on a down-scaling deep neural network (DNN) to a second original image obtained as a result of the pre-processing; generating image data by performing first encoding on the first image; and transmitting the image data.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2 is a block diagram of a structure of an AI decoding apparatus according to an embodiment of the disclosure;

FIG. 5 is a table showing a mapping relationship between several pieces of image-related information and several DNN setting information;

DETAILED DESCRIPTION

Figure 1A:
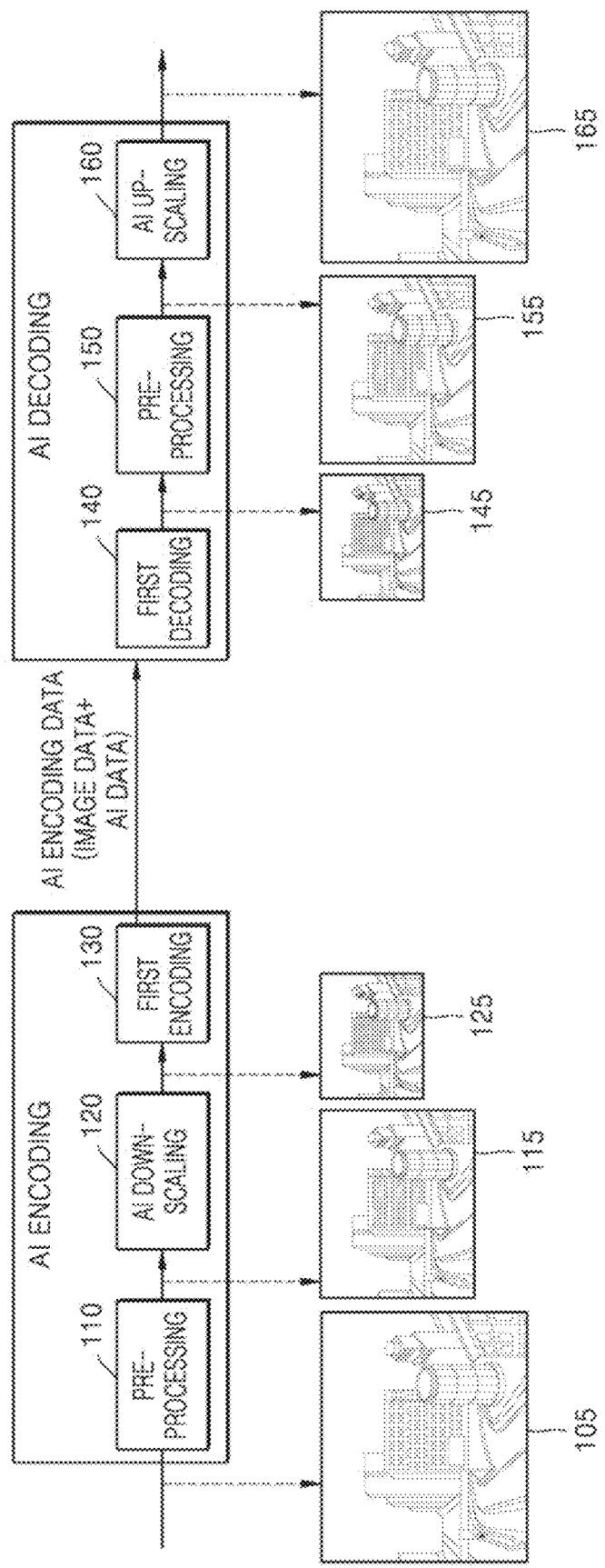
FIG. 1A is a diagram for describing an artificial intelligence (AI) encoding process and a first AI decoding process, according to an embodiment of the disclosure.

As the disclosure allows for various changes and numerous embodiments, exemplary embodiments of the disclosure will be illustrated in the drawings and described in detail in the written description. However, this is not intended to limit the disclosure to particular modes of practice, and it is to be appreciated that all changes, equivalents, and substitutes that do not depart from the spirits and technical scopes of several embodiments of the disclosure are encompassed in the disclosure.

In the description of embodiments of the disclosure, certain detailed explanations of the related art are omitted when it is deemed that they may unnecessarily obscure the essence of the disclosure. While such terms as "first," "second," etc., may be used to describe various components, such components must not be limited to the above terms. The above terms are used only to distinguish one component from another.

When an element (e.g., a first element) is "coupled to" or "connected to" another element (e.g., a second element), the first element may be directly coupled to or connected to the second element, or, unless otherwise described, a third element may exist therebetween.

In the present specification, regarding an element represented as a "unit" or a "module", two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another component.

Throughout the disclosure, the expression "at least one of a, b or c" indicates only a, only b, only c, both a and b, both a and c, both b and c, all of a, b, and c, or variations thereof.

Also, in the present specification, an 'image' or a 'picture' may denote a still image, a moving image including a plurality of consecutive still images (or frames), or a video.

Also, in the present specification, a deep neural network (DNN) is a representative example of an artificial neural network model simulating brain nerves, and is not limited to an artificial neural network model using a specific algorithm. In the present specification, a DNN may be referred to as a neural network (NN).

Also, in the present specification, a 'parameter' is a value used in an operation process of each layer forming a neural network, and for example, may include a weight used when an input value is applied to a certain operation expression. Here, the parameter may be expressed in a matrix form. The parameter is a value set as a result of training, and may be updated through separate training data when necessary.

Also, in the present specification, a 'first DNN' indicates a DNN used for artificial intelligence (AI) down-scaling an image, and a 'second DNN' indicates a DNN used for AI up-scaling an image.

Also, in the present specification, 'DNN setting information' includes information related to an element constituting a DNN. 'DNN setting information' includes the parameter described above as information related to the element constituting the DNN. The first DNN or the second DNN may be set by using the DNN setting information, and may operate according to the set DNN setting information.

Also, in the present specification, a 'first original image' denotes an image to be an object of AI encoding, a 'second original image' denotes an image obtained as a result of pre-processing during an AI encoding process, and a 'first image' denotes an image obtained as a result of performing AI down-scaling during the AI encoding process. A 'second image' denotes an image obtained via first decoding during an AI decoding process, a 'third image' denotes an image obtained as a result of pre-processing during the AI decoding process, and a 'fourth image' denotes an image obtained by performing AI up-scaling during the AI decoding process.

Also, in the present specification, 'AI down-scale' denotes a process of decreasing resolution of an image according to a predetermined scaling factor, based on AI, and 'first encoding' denotes an encoding process according to an image compression method based on frequency transformation. Also, 'first decoding' denotes a decoding process according to an image reconstruction method based on frequency transformation, and 'AI up-scale' denotes a process of increasing resolution of an image according to a predetermined scaling factor, based on AI. The scaling factor could be referred to scaling magnification.

FIG. 1A is a diagram for describing an AI encoding process and a first AI decoding process, according to an embodiment of the disclosure.

As described above, when resolution of an image remarkably increases, the throughput of information for encoding and decoding the image is increased, and accordingly, a method for improving efficiency of encoding and decoding of an image is required.

As shown in FIG. 1A, according to an embodiment of the disclosure, a first image 125 is obtained by performing pre-processing 110 and AI down-scaling 120 on a first original image 105 having high resolution. Then, first encoding 130 and first decoding 140 are performed on the first image 125 having relatively low resolution, and thus a bitrate may be largely reduced compared to when the first encoding 130 and the first decoding 140 are performed on the first original image 105.

In detail, referring to FIG. 1A, during the AI encoding process, a second original image 115 is obtained by performing the pre-processing 110 to change the resolution of the first original image 105, and the first image 125 is obtained by performing the AI down-scaling 110 on the second original image 115. The first image 125 undergoes the first encoding 130.

During the AI decoding process, AI encoding data including AI data and image data, which are obtained as a result of AI encoding, is received, a second image 145 is obtained via the first decoding 140, and a third image 155 is obtained by performing pre-processing 150 to change the resolution of the second image 145. A fourth image 165 is obtained by performing AI up-scaling 160 on the third image 155. The fourth image 165 is post-processed as necessary and then is reproduced by a display (not shown).

Referring to the AI encoding process in detail, when the first original image 105 is received, the pre-processing 110 and the AI down-scaling 120 are performed on the first original image 105 to obtain the first image 125 of certain resolution or certain quality.

The pre-processing 110 includes a legacy scaling process, and the resolution of the first original image 105 may be changed to an arbitrary resolution via the pre-processing 110. The resolution of the first original image 105 is changed to an arbitrary resolution to diversify the resolution of the first image 125 as a target of the first encoding 130. By diversifying the resolution of the first image 125, the size of image data that is transmitted via a network or stored in a storage medium may be adjusted according to circumstances.

The AI down-scaling 120 is performed based on AI, and AI for the AI down-scaling 120 needs to be trained jointly with AI for the AI up-scaling 160. This is because, when the AI for the AI down-scaling 120 and the AI for the AI up-scaling 160 are separately trained, a difference between the first original image 105, which is an object of AI encoding, and the fourth image 165 reconstructed through AI decoding is increased.

In an embodiment of the disclosure, the AI data may be used to maintain such a joint relationship during the AI encoding process and the AI decoding process. Accordingly, the AI data obtained through the AI encoding process may include information indicating an up-scaling target, and during the AI decoding process, the AI up-scaling 160 needs to be performed on the third image 155 according to the up-scaling target verified based on the AI data.

The AI for the AI down-scaling 120 and the AI for the AI up-scaling 160 may be embodied as a DNN. As will be described later with reference to FIGS. 9, 11, and 12, because a first DNN and a second DNN are jointly trained under a certain target, an AI encoding apparatus may provide target information used during joint training of the first DNN and the second DNN to an AI decoding apparatus, and the AI decoding apparatus may perform the AI up-scaling 160 on the third image 155 to target resolution or quality based on the provided target information.

Regarding the first encoding 130 of FIG. 1A, information amount of the first image 125 obtained by performing the AI down-scaling 120 on the second original image 115 may be reduced through the first encoding 130. The first encoding 130 may include a process of generating prediction data by predicting the first image 125, a process of generating residual data corresponding to a difference between the first image 125 and the prediction data, a process of transforming the residual data of a spatial domain component to a frequency domain component, a process of quantizing the residual data transformed to the frequency domain component, and a process of entropy-encoding the quantized residual data. Such first encoding 130 may be performed via one of image compression methods using frequency transformation, such as MPEG-2, H.264 Advanced Video Coding (AVC), MPEG-4, High Efficiency Video Coding (HEVC), VC-1, VP8, VP9, and AOMedia Video 1 (AV1).

The AI encoding data obtained through the AI encoding process may include the image data obtained as a result of performing the first encoding 130 on the first image 125, and the AI data related to the AI down-scaling 120 of the second original image 115. The image data may be used during the first decoding 140 and the AI data may be used during the AI up-scaling 160.

The image data may be transmitted in a form of a bitstream. The image data may include data obtained based on pixel values in the first image 125, for example, residual data that is a difference between the first image 125 and prediction data of the first image 125. Also, the image data includes pieces of information used during the first encoding 130 performed on the first image 125. For example, the image data may include prediction mode information, motion information, and information related to quantization parameter used during the first encoding 130. The image data may be generated according to a rule, for example, according to a syntax, of an image compression method used during the first encoding 130, among MPEG-2, H.264 AVC, MPEG-4, HEVC, VC-1, VP8, VP9, and AV1.

The second image 145 corresponding to the first image 125 may be reconstructed by performing the first decoding 140 on the image data. The first decoding 140 may include a process of generating the quantized residual data by entropy-decoding the image data, a process of inverse-quantizing the quantized residual data, a process of transforming the residual data of the frequency domain component to the spatial domain component, a process of generating the prediction data, and a process of reconstructing the second image 145 by using the prediction data and the residual data. Such first decoding 140 may be performed via an image reconstruction method corresponding to one of the image compression methods using frequency transformation, such as MPEG-2, H.264 AVC, MPEG-4, HEVC, VC-1, VP8, VP9, and AV1, which is used in the first encoding 130.

The resolution of the second image 145 obtained by performing the first decoding 140 on the image data is changed via the pre-processing 150. The pre-processing 150 includes a legacy scaling process, and the resolution of the second image 145 may be changed to an arbitrary resolution via the pre-processing 150. The resolution of the second image 145 is changed to an arbitrary resolution to diversify the resolution of the fourth image 165, which is to be reproduced, or the resolution of a pre-processed fourth image. In other words, because the resolution of an image that may be reproduced by the display may vary according to the performance of the display, the display may reproduce the fourth image 165 without errors by diversifying the resolution of the fourth image 165.

The AI data is used in the AI up-scaling 160 based on the second DNN. As described above, because the first DNN and the second DNN are jointly trained, the AI data includes information enabling the AI up-scaling 160 to be performed accurately on the third image 155 through the second DNN. During the AI decoding process, the AI up-scaling 160 may be performed on the third image 155 to have targeted resolution and/or quality, based on the AI data.

The AI data may be transmitted together with the image data in a form of a bitstream. Alternatively, according to an embodiment of the disclosure, the AI data may be transmitted separately from the image data, in a form of a frame or a packet. The AI data and the image data obtained as a result of the AI encoding may be transmitted through the same network or through different networks.

Figure 1B:
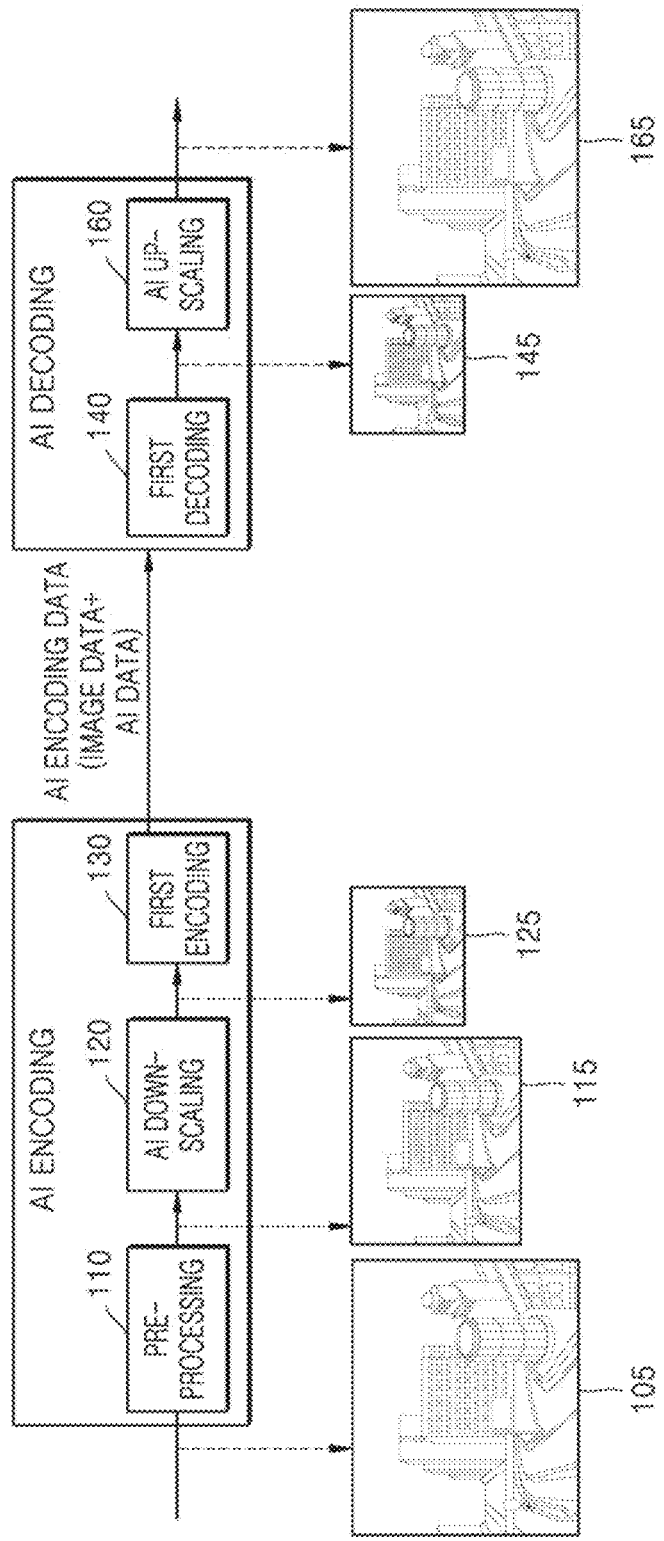
FIG. 1B is a diagram for describing an AI encoding process and a second AI decoding process, according to an embodiment of the disclosure.
Figure 1C:
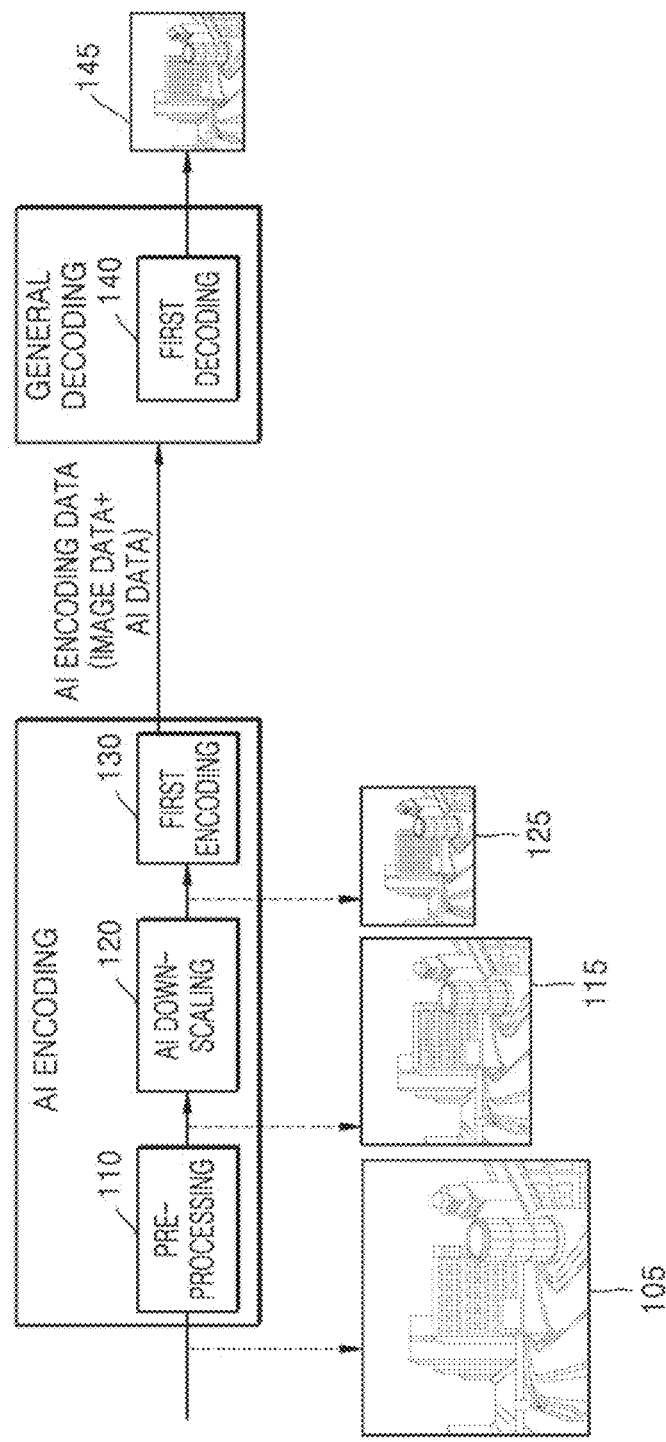
FIG. 1C is a diagram for describing an AI encoding process and a general decoding process, according to an embodiment of the disclosure.

FIG. 1B is a diagram for describing an AI encoding process and a second AI decoding process, according to an embodiment of the disclosure.

FIG. 1B is a diagram for describing a case where an AI decoding apparatus that receives AI encoding data does not perform pre-processing. Referring to FIG. 1B, during the AI decoding process, a second image 145 is obtained by performing the first decoding 140 on image data, and a fourth image 165 is obtained by performing the AI up-scaling 160 on the second image 145. The fourth image 165 or a fourth image post-processed as necessary may be reproduced by the display.

The AI down-scaling 120 and the AI up-scaling 160 are performed based on AI, and AI for the AI down-scaling 120 needs to be trained jointly with AI for the AI up-scaling 160 on the second image 145. This is because, when the AI for the AI down-scaling 120 and the AI for the AI up-scaling 160 are separately trained, a difference between the first original image 105, which is an object of AI encoding, and the fourth image 165 reconstructed through AI decoding is increased.

Because the resolution of the second image 145 may not be changed to an arbitrary resolution during the AI decoding process of FIG. 1B, the resolution of the first image 125 may be determined based on at least one of a network state, the performance of the display reproducing the fourth image 165, or a scaling factor of the AI up-scaling 160 during the AI encoding process.

Figure 10:
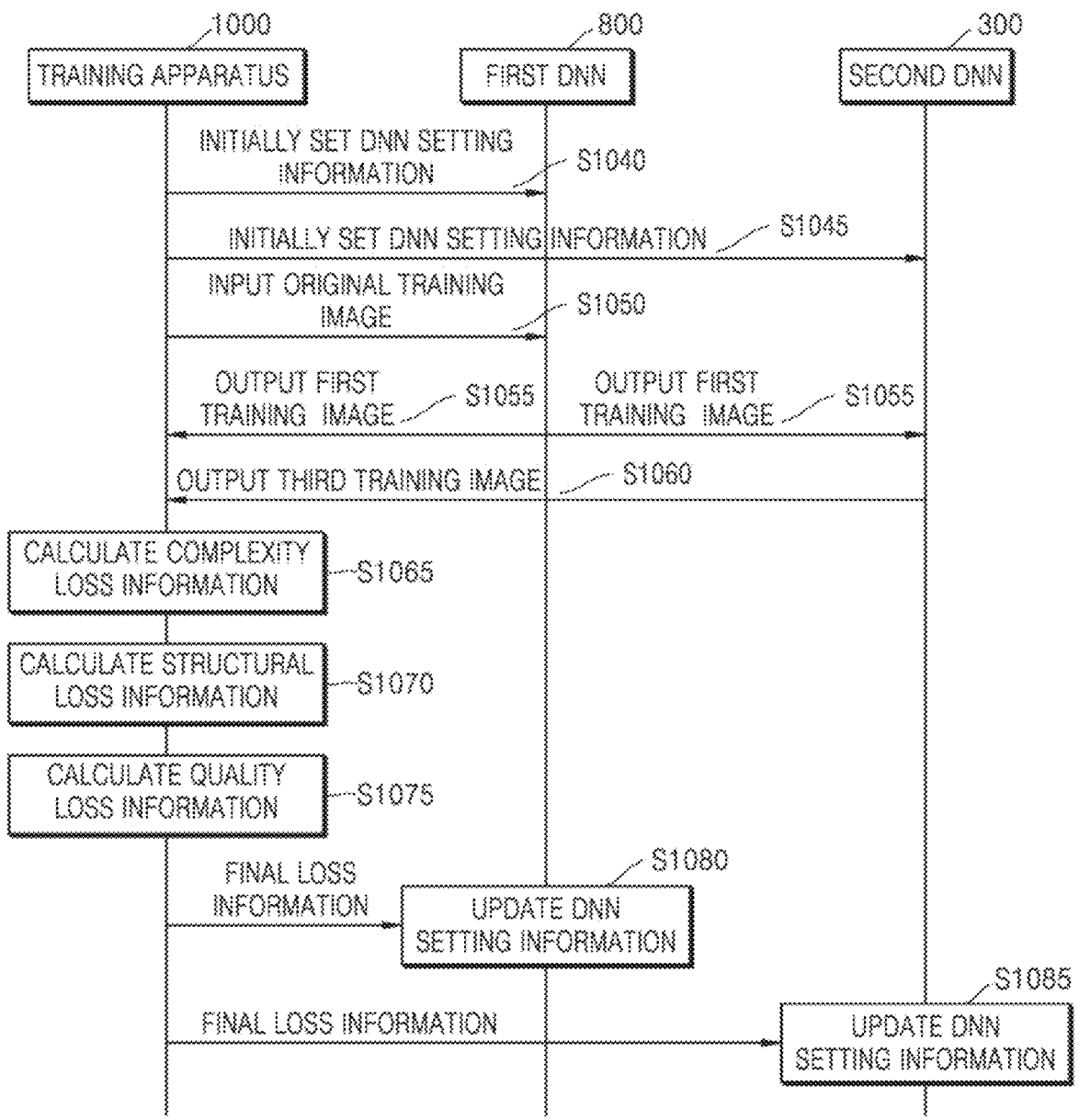
FIG. 10 is a diagram for describing training processes of a first DNN and a second DNN, performed by a training apparatus.

FIG. 10 is a diagram for describing an AI encoding process and a general decoding process, according to an embodiment of the disclosure.

FIG. 10 is a diagram for describing a case where a general decoding apparatus that receives AI encoding data does not perform an AI decoding process. Referring to FIG. 10, the general decoding apparatus performs only the first decoding 140.

AI encoding data including image data and AI data generated via the AI encoding process is transmitted toward the general decoding apparatus. Because the general decoding apparatus may not process the AI data, the general decoding apparatus outputs the second image 145 by performing the first decoding 140 on only the image data. The second image 145 or a second image post-processed as necessary may be reproduced by the display.

Because the resolution of the second image 145 is not changed during the general decoding process of FIG. 10, the resolution of the first image 125 may be determined based on a network state and/or the performance of the display reproducing the fourth image 165 during the AI encoding process.

FIG. 2 is a block diagram of a configuration of an AI decoding apparatus 200 according to an embodiment of the disclosure.

Referring to FIG. 2, the AI decoding apparatus 200 may include a receiver 210 and an AI decoder 230. The receiver 210 may include a communication interface 212, a parser 214, and an output interface 216. The AI decoder 230 may include a first decoder 232, a pre-processor 234, and an AI up-scaler 236.

The receiver 210 receives and parses AI encoding data obtained as a result of AI encoding, and distinguishably outputs image data and AI data to the AI decoder 230.

In detail, the communication interface 212 receives the AI encoding data obtained as the result of AI encoding through a network. The AI encoding data includes the image data and the AI data. The image data and the AI data may be received through a same type of network or different types of networks.

The parser 214 receives the AI encoding data received through the communication interface 212 and parses the AI encoding data to distinguish the image data and the AI data. For example, the parser 214 may distinguish the image data and the AI data by reading a header of data obtained from the communication interface 212. According to an embodiment of the disclosure, the parser 214 distinguishably transmits the image data and the AI data to the output interface 216 via the header of the data received through the communication interface 212, and the output interface 216 transmits the image data and the AI data respectively to the first decoder 232 and the AI up-scaler 236. At this time, the parser 214 may verify that the image data included in the AI encoding data is image data generated via a certain codec (for example, MPEG-2, H.264 AVC, MPEG-4, HEVC, VC-1, VP8, VP9, or AV1). In this case, the parser 214 may transmit corresponding information to the first decoder 232 through the output interface 216 such that the image data is processed via the verified codec.

According to an embodiment of the disclosure, the AI encoding data parsed by the parser 214 may be obtained from a data storage medium including a magnetic medium (such as a hard disk, a floppy disk, or a magnetic tape), an optical recording medium (such as CD-ROM or DVD), or a magneto-optical medium (such as a floptical disk).

The first decoder 232 reconstructs the second image 145 corresponding to the first image 125, based on the image data. The second image 145 obtained by the first decoder 232 is provided to the pre-processor 234. According to an embodiment of the disclosure, first decoding related information, such as prediction mode information, motion information, quantization parameter (QP) information, or the like included in the image data may be provided to the AI up-scaler 236.

The pre-processor 234 performs pre-processing of changing the resolution of the second image 145 based on an output resolution. The pre-processor 234 changes the resolution of the second image 145 via legacy scaling. Here, the legacy scaling is scaling not using a neural network, and may include, for example, at least one of bilinear scaling, bicubic scaling, lanczos scaling, or stair step scaling.

AI-based scaling changes the resolution of an image with a parameter optimized based on training, whereas the legacy scaling changes the resolution of an image according to a pre-determined rule. The legacy scaling is different from the AI-based scaling in that a formula or weight used in the legacy scaling is not updated according to training based on training data.

The pre-processor 234 determines the output resolution. The output resolution indicates the resolution of the fourth image 165 obtained by the AI up-scaler 236.

The pre-processor 234 may determine the output resolution according to an input from a user. Alternatively, the pre-processor 234 may determine the output resolution according to the performance of the display that reproduces the fourth image 165 or the post-processed fourth image. The performance of the display may indicate a minimum resolution or maximum resolution expressible by the display. In other words, the pre-processor 234 may determine, as the output resolution, resolution equal to or greater than the maximum resolution or resolution selected among the minimum resolution to the maximum resolution so that the fourth image 165 may be smoothly reproduced by the display.

When the output resolution is determined, the pre-processor 234 obtains a target resolution of the third image 155, based on the output resolution. Because the resolution of the fourth image 165 obtained via AI up-scaling needs to be equal to the output resolution, the pre-processor 234 may calculate the target resolution of the third image 155 based on a scaling factor of the AI up-scaler 236 and the output resolution. In detail, when the output resolution is a×b and the scaling factor is s (where s is a rational number equal to or greater than 1), the pre-processor 234 may calculate the target resolution of the third image 155 as (a/s)×(b/s). The pre-processor 234 may receive information about the scaling factor of the AI up-scaler 236 from the AI up-scaler 236 or may previously store information about the scaling factor of the AI up-scaler 236.

The pre-processor 234 may change the resolution of the second image 145 according to a ratio between the resolution of the second image 145 and the target resolution such that the third image 155 may have the target resolution.

As described above, the pre-processor 234 changes the resolution of the second image 145 via legacy scaling that may change the resolution of an image at an arbitrary factor in contrast with the AI-based scaling. In detail, because a DNN used in the AI-based scaling scales an image according to a pre-trained parameter, the DNN may not scale an image at various factors. However, the legacy scaling may reduce (e.g., sampling) or increase (e.g., interpolation) the number of pixels within an image according to a pre-determined rule, thereby generating an image of desired resolution.

The third image 155 is provided from the pre-processor 234 to the AI up-scaler 236. Upon receiving the AI data, the AI up-scaler 236 performs AI up-scaling on the third image 155, based on the AI data. According to an embodiment of the disclosure, the AI up-scaler 236 may perform the AI up-scaling on the third image 155 by further using the first decoding related information, such as the prediction mode information, the quantization parameter information, or the like included in the image data.

The receiver 210 and the AI decoder 230 according to an embodiment of the disclosure are described as individual devices, but may be implemented through one processor. In this case, the receiver 210 and the AI decoder 230 may be implemented through a dedicated processor or through a combination of software and a general-purpose processor such as an application processor (AP), a central processing unit (CPU), or a graphic processing unit (GPU). The dedicated processor may be implemented by including a memory for implementing an embodiment of the disclosure or by including a memory processor for using an external memory.

Also, the receiver 210 and the AI decoder 230 may be configured by a plurality of processors. In this case, the receiver 210 and the AI decoder 230 may be implemented through a combination of dedicated processors or through a combination of software and a plurality of general-purpose processors such as an AP, a CPU, or a GPU. Similarly, the pre-processor 234, the AI up-scaler 236, and the first decoder 232 may be implemented as different processors.

The AI data provided to the AI up-scaler 236 includes pieces of information enabling the second image 155 to undergo AI up-scaling according to an up-scaling target. Here, the up-scaling target should correspond to a down-scaling target of a first DNN. Accordingly, the AI data should include information for verifying the down-scaling target of the first DNN.

Examples of the information included in the AI data include difference information between resolution of the second original image 115 and resolution of the first image 125, and/or information related to the first image 125.

The difference information may be expressed as information about a resolution conversion degree of the first image 125 compared to the second original image 115 (for example, resolution conversion rate information). Also, because the resolution of the first image 125 is ascertained through the resolution of the reconstructed second image 145 and the resolution conversion degree is verified accordingly, the difference information may be expressed only as resolution information of the second original image 115. Here, the resolution information may be expressed as vertical/horizontal sizes or as a ratio (16:9, 4:3, or the like) and a size of one axis. Also, when there is pre-set resolution information, the resolution information may be expressed in a form of an index or flag.

The information related to the first image 125 may include information about at least one of a bitrate of the image data obtained as the result of performing first encoding on the first image 125 or a codec type used during the first encoding of the first image 125.

The AI up-scaler 236 may determine the up-scaling target of the third image 155, based on at least one of the difference information or the information related to the first image 125, which are included in the AI data. The up-scaling target may indicate, for example, to what degree resolution is to be up-scaled for the third image 155, namely, a scaling factor. When the up-scaling target is determined, the AI up-scaler 236 performs AI up-scaling on the third image 155 through a second DNN to obtain the fourth image 165 corresponding to the up-scaling target.

FIG. 2 illustrates that the AI decoder 230 includes the pre-processor 234, in order to perform the first AI decoding process of FIG. 1A. To perform the second AI decoding process of FIG. 1B, the AI decoding apparatus 200 does not include the pre-processor 234. Accordingly, the second image 145 obtained by the first decoder 232 may be provided to the AI up-scaler 236, and the AI up-scaler 236 may perform AI up-scaling on the second image 145 through a second DNN to obtain the fourth image 165 corresponding to the up-scaling target.

Processes related with the third image 155, which will be described below, for example, AI up-scaling and DNN setting information selection, are also applicable to the second image 145.

Before describing a method, performed by the AI up-scaler 236, of performing AI up-scaling on the third image 155 according to the up-scaling target, an AI up-scaling process through the second DNN will be described with reference to FIGS. 3 and 4.

Figure 3:
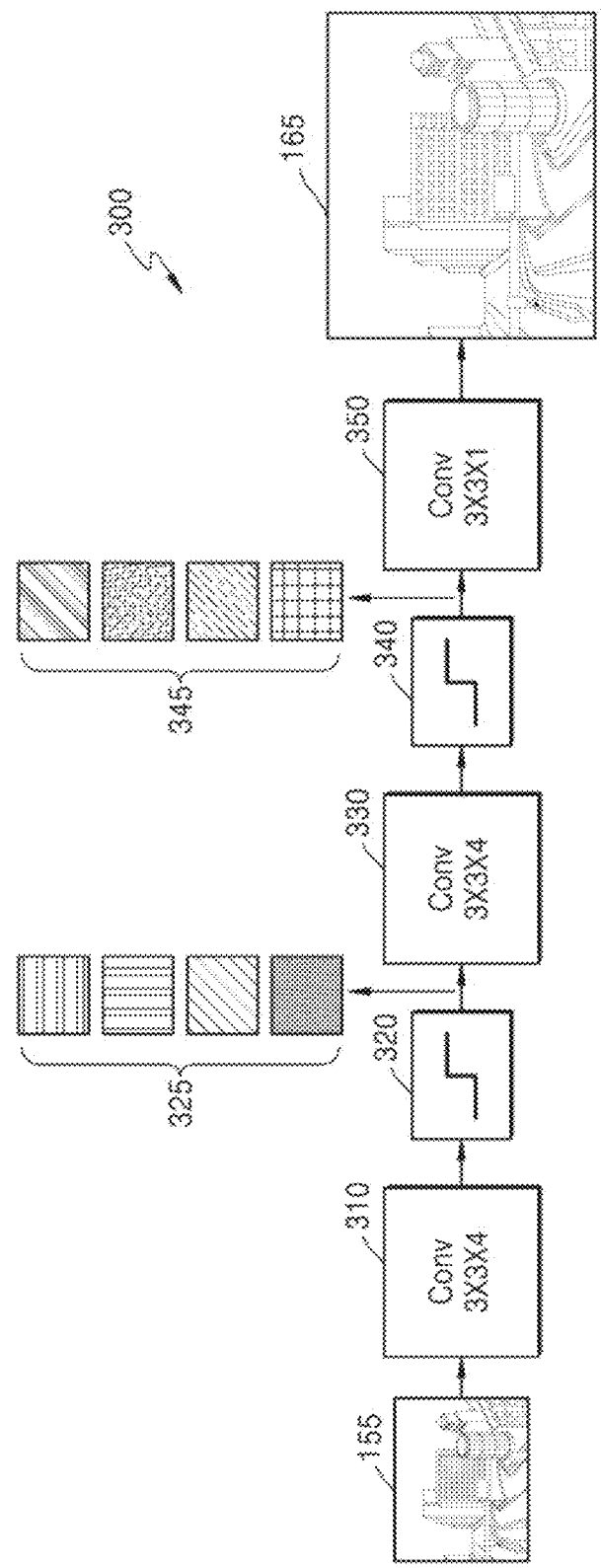
FIG. 3 is a diagram showing a second deep neural network (DNN) for performing AI up-scaling on a third image.
Figure 4:
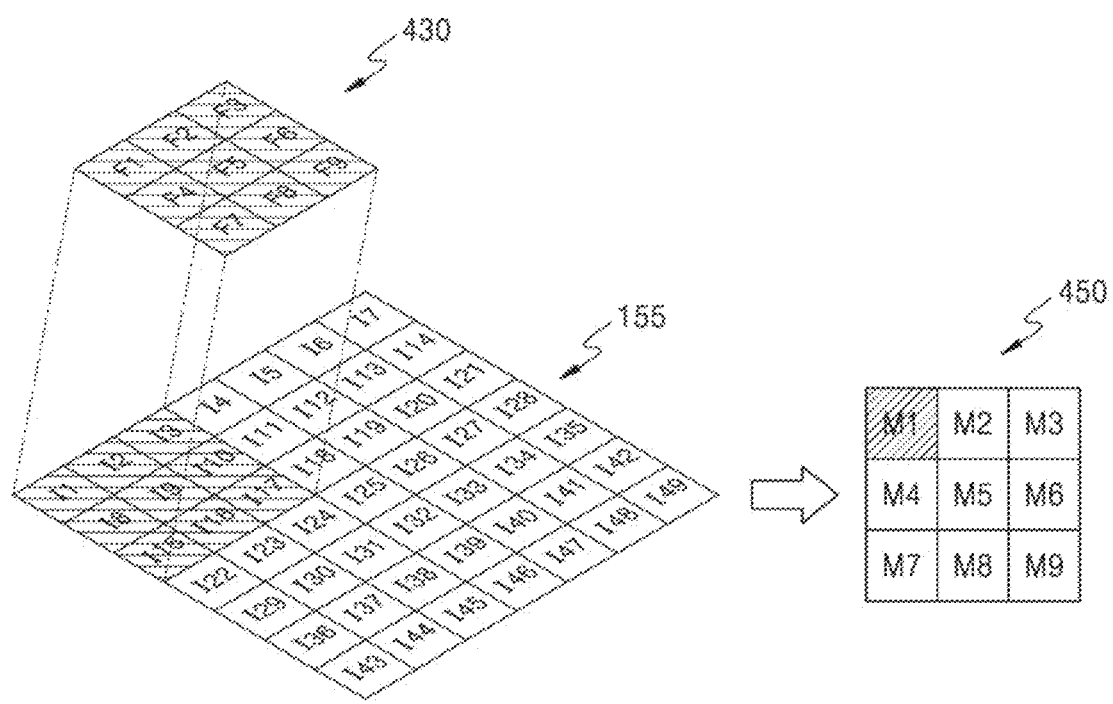
FIG. 4 is a diagram for describing a convolution operation in a convolution layer.

FIG. 3 is a diagram showing a second DNN 300 for performing AI up-scaling on the third image 155, and FIG. 4 is a diagram for describing a convolution operation in a first convolution layer 310 of FIG. 3.

As shown in FIG. 3, the second image 155 is input to the first convolution layer 310. 3×3×4 indicated in the first convolution layer 310 shown in FIG. 3 indicates that a convolution process is performed on one input image by using four filter kernels having a size of 3×3. Four feature maps are generated by the four filter kernels as a result of the convolution process. Each feature map indicates inherent characteristics of the third image 155. For example, each feature map may represent a vertical direction characteristic, a horizontal direction characteristic, or an edge characteristic of the third image 155.

A convolution operation in the first convolution layer 310 will be described in detail with reference to FIG. 4.

One feature map 450 may be generated through multiplication and addition between parameters of a filter kernel 430 having a size of 3×3 used in the first convolution layer 310 and corresponding pixel values in the third image 155. Because four filter kernels are used in the first convolution layer 310, four feature maps may be generated through the convolution operation using the four filter kernels.

I1 through I49 indicated in the third image 155 in FIG. 4 indicate pixels in the third image 155, and F1 through F9 indicated in the filter kernel 430 indicate parameters of the filter kernel 430. Also, M1 through M9 indicated in the feature map 450 indicate samples of the feature map 450.

In FIG. 4, the third image 155 includes 49 pixels, but the number of pixels is only an example. When the third image 155 has a resolution of 4 K, the third image 155 may include, for example, 3840×2160 pixels.

During a convolution operation process, pixel values of I1, I2, I3, I8, I9, I10, I15, I16, and I17 of the third image 155 and F1 through F9 of the filter kernels 430 are respectively multiplied, and a value of combination (for example, addition) of result values of the multiplications may be assigned as a value of M1 of the feature map 450. When a stride of the convolution operation is 2, pixel values of I3, I4, I5, I10, I11, I12, I17, I18, and I19 of the third image 155 and F1 through F9 of the filter kernels 430 are respectively multiplied, and the value of the combination of the result values of the multiplications may be assigned as a value of M2 of the feature map 450.

While the filter kernel 430 is moving along the stride to the last pixel of the third image 155, the convolution operation is performed between the pixel values in the third image 155 and the parameters of the filter kernel 430, and thus the feature map 450 having a certain size may be generated.

According to the present disclosure, values of parameters of a second DNN, for example, values of parameters of a filter kernel used in convolution layers of the second DNN (for example, F1 through F9 of the filter kernel 430), may be optimized through joint training of a first DNN and the second DNN. As described above, the AI up-scaler 236 may determine an up-scaling target corresponding to a down-scaling target of the first DNN, based on AI data, and determine parameters corresponding to the determined up-scaling target as the parameters of the filter kernel used in the convolution layers of the second DNN.

Convolution layers included in the first DNN and the second DNN may perform processes according to the convolution operation process described with reference to FIG. 4, but the convolution operation process described with reference to FIG. 4 is only an example and is not limited thereto.

Referring back to FIG. 3, the feature maps output from the first convolution layer 310 may be input to a first activation layer 320.

The first activation layer 320 may assign a non-linear feature to each feature map. The first activation layer 320 may include a sigmoid function, a Tanh function, a rectified linear unit (ReLU) function, or the like, but is not limited thereto.

The first activation layer 320 assigning the non-linear feature indicates that some sample values of the feature map, which is an output of the first convolution layer 310, is changed. Here, the change is performed by applying the non-linear feature.

The first activation layer 320 determines whether to transmit sample values of the feature maps output from the first convolution layer 310 to a second convolution layer 330. For example, some of the sample values of the feature maps are activated by the first activation layer 320 and transmitted to the second convolution layer 330, and some of the sample values are deactivated by the first activation layer 320 and not transmitted to the second convolution layer 330. The intrinsic characteristics of the third image 155 represented by the feature maps are emphasized by the first activation layer 320.

Feature maps 325 output from the first activation layer 320 are input to the second convolution layer 330. One of the feature maps 325 shown in FIG. 3 is a result of processing the feature map 450 described with reference to FIG. 4 in the first activation layer 320.

3×3×4 indicated in the second convolution layer 330 indicates that a convolution process is performed on the feature maps 325 by using four filter kernels having a size of 3×3. An output of the second convolution layer 330 is input to a second activation layer 340. The second activation layer 340 may assign a non-linear feature to input data.

Feature maps 345 output from the second activation layer 340 are input to a third convolution layer 350. 3×3×1 indicated in the third convolution layer 350 shown in FIG. 3 indicates that a convolution process is performed to generate one output image by using one filter kernel having a size of 3×3. The third convolution layer 350 is a layer for outputting a final image, and generates one output by using one filter kernel. According to an embodiment of the disclosure, the third convolution layer 350 may output the fourth image 145 as a result of a convolution operation.

There may be a plurality of DNN setting information indicating the numbers of filter kernels of the first, second, and third convolution layers 310, 330, and 350 of the second DNN 300, parameters of the filter kernels of the first, second, and third convolution layers 310, 330, and 350 of the second DNN 300, and the like, as will be described later, and the plurality of DNN setting information should be connected to a plurality of DNN setting information of a first DNN. The connection between the plurality of DNN setting information of the second DNN and the plurality of DNN setting information of the first DNN may be realized via joint training of the first DNN and the second DNN.

In FIG. 3, the second DNN 300 includes three convolution layers, namely, the first, second, and third convolution layers 310, 330, and 350, and two activation layers, namely, the first and second activation layers 320 and 340, but this is only an example, and the numbers of convolution layers and activation layers may vary according to an embodiment of the disclosure. Also, according to an embodiment of the disclosure, the second DNN 300 may be implemented as a recurrent neural network (RNN). In this case, a convolutional neural network (CNN) structure of the second DNN 300 according to an embodiment of the disclosure is changed to an RNN structure.

According to an embodiment of the disclosure, the AI up-scaler 236 may include at least one arithmetic logic unit (ALU) for the convolution operation and the operation of the activation layer described above. The ALU may be implemented as a processor. For the convolution operation, the ALU may include a multiplier that performs multiplication between sample values of the third image 155 or the feature map output from a previous layer and sample values of the filter kernel, and an adder that adds result values of the multiplication. Also, for the operation of the activation layer, the ALU may include a multiplier that multiplies an input sample value by a weight used in a pre-determined sigmoid function, a Tanh function, or an ReLU function, and a comparator that compares a multiplication result and a certain value to determine whether to transmit the input sample value to a next layer.

A method, performed by the AI up-scaler 236, of performing the AI up-scaling on the third image 155 according to the up-scaling target will now be described.

According to an embodiment of the disclosure, the AI up-scaler 236 may store a plurality of DNN setting information settable in a second DNN.

Here, the DNN setting information may include information about at least one of the number of convolution layers included in the second DNN, the number of filter kernels for each convolution layer, or a parameter of each filter kernel. The plurality of DNN setting information may respectively correspond to various up-scaling targets, and the second DNN may operate based on DNN setting information corresponding to a certain up-scaling target.

The second DNN may have different structures based on the DNN setting information. For example, the second DNN may include three convolution layers according to any piece of DNN setting information, or may include four convolution layers according to another piece of DNN setting information.

According to an embodiment of the disclosure, the DNN setting information may only include a parameter of a filter kernel used in the second DNN. In this case, the structure of the second DNN does not change, but only the parameter of the internal filter kernel may change based on the DNN setting information.

The AI up-scaler 236 may obtain the DNN setting information for performing AI up-scaling on the third image 155, among the plurality of DNN setting information. Each of the plurality of DNN setting information used at this time is information for obtaining the fourth image 165 of a pre-determined resolution and/or pre-determined quality, and is trained jointly with a first DNN.

For example, one piece of DNN setting information among the plurality of DNN setting information may include pieces of information for obtaining the fourth image 165 of resolution twice higher than resolution of the third image 155, for example, the fourth image 165 of 4 K (4096×2160) twice higher than 2 K (2048×1080) of the third image 155, and another piece of DNN setting information may include pieces of information for obtaining the fourth image 165 of resolution four times higher than the resolution of the third image 155, for example, the third image 165 of 8 K (8192×4320) four times higher than 2 K (2048×1080) of the third image 155.

Figure 7:
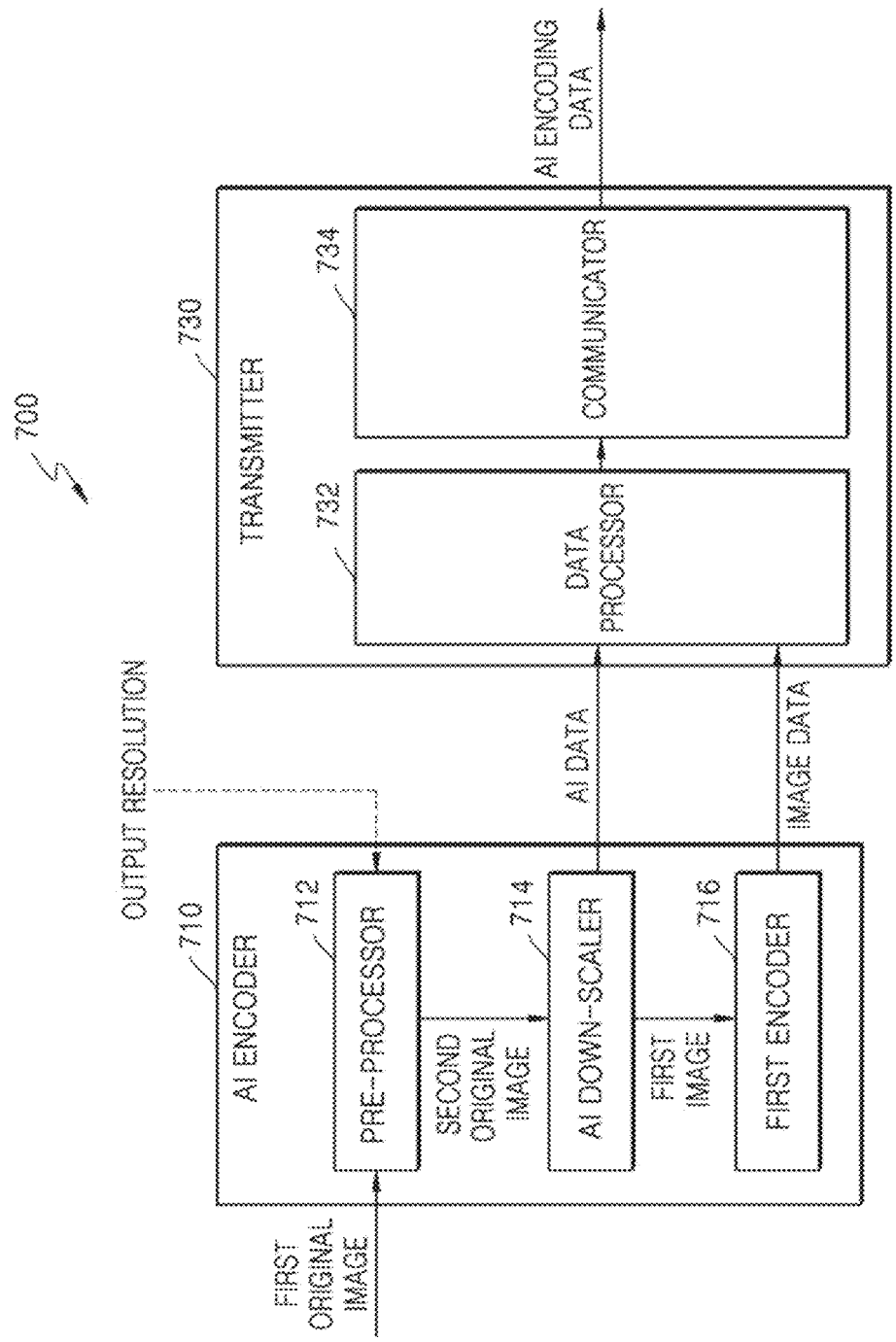
FIG. 7 is a block diagram of a structure of an AI encoding apparatus according to an embodiment of the disclosure.

Each of the plurality of DNN setting information is obtained jointly with DNN setting information of the first DNN of an AI encoding apparatus 700 of FIG. 7. The AI up-scaler 236 obtains one piece of DNN setting information among the plurality of DNN setting information according to an enlargement factor corresponding to a reduction factor of the DNN setting information of the first DNN. To this end, the AI up-scaler 236 needs to verify information of the first DNN. In order for the AI up-scaler 236 to verify the information of the first DNN, the AI decoding apparatus 200 according to an embodiment of the disclosure receives AI data including the information of the first DNN from the AI encoding apparatus 700.

In other words, the AI up-scaler 236 may verify information targeted by DNN setting information of the first DNN used to obtain the first image 125 and obtain the DNN setting information of the second DNN trained jointly with the DNN setting information of the first DNN, by using pieces of information received from the AI encoding apparatus 700.

When DNN setting information for performing the AI up-scaling on the third image 155 is obtained from among the plurality of DNN setting information, input data may be processed based on the second DNN operating according to the obtained DNN setting information.

For example, when any one piece of DNN setting information is obtained, the number of filter kernels included in each of the first, second, and third convolution layers 310, 330, and 350 of the second DNN 300 of FIG. 3, and the parameters of the filter kernels are set as values included in the obtained DNN setting information.

In detail, parameters of a filter kernel of 3×3 used in any one convolution layer of the second DNN 300 of FIG. 3 are set with {1, 1, 1, 1, 1, 1, 1, 1, 1}, and, when DNN setting information is changed afterwards, the parameters may be replaced by {2, 2, 2, 2, 2, 2, 2, 2, 2} that are parameters included in the changed DNN setting information.

The AI up-scaler 236 may obtain the DNN setting information for AI up-scaling on the third image 155 from among the plurality of DNN setting information, based on information included in the AI data, and the AI data used to obtain the DNN setting information will now be described.

According to an embodiment of the disclosure, the AI up-scaler 236 may obtain the DNN setting information for AI up-scaling on the third image 155 from among the plurality of DNN setting information, based on difference information included in the AI data. For example, when it is verified that the resolution (for example, 4 K (4096×2160)) of the second original image 115 is twice higher than the resolution (for example, 2 K (2048×1080)) of the first image 125, based on the difference information, the AI up-scaler 236 may obtain the DNN setting information for doubling the resolution of the third image 135, namely, DNN setting information having a scaling factor of 2.

According to another embodiment of the disclosure, the AI up-scaler 236 may obtain the DNN setting information for AI up-scaling on the third image 155 from among the plurality of DNN setting information, based on information related to the first image 125 included in the AI data. The AI up-scaler 236 may pre-determine a mapping relationship between pieces of image-related information and DNN setting information, and obtain the DNN setting information mapped to the information related to the first image 125.

FIG. 5 is a table showing a mapping relationship between several pieces of image-related information and several DNN setting information.

Through an embodiment of the disclosure according to FIG. 5, it will be determined that AI encoding and AI decoding processes according to an embodiment of the disclosure do not only consider a change of resolution. As shown in FIG. 5, DNN setting information may be selected considering resolution, such as standard definition (SD), high definition (HD), or full HD, a bitrate, such as 10 Mbps, 15 Mbps, or 20 Mbps, and codec information, such as AV1, H.264, or HEVC, individually or collectively. For such consideration of the resolution, the bitrate and the codec information, training in consideration of each element needs to be jointly performed with encoding and decoding processes during an AI training process (see FIGS. 9, 11, and 12).

Accordingly, when a plurality of DNN setting information are provided based on image-related information including a codec type, resolution of an image, and the like, as shown in FIG. 5 according to training, the DNN setting information for AI up-scaling the third image 155 may be obtained based on the information related to the first image 125 received during the AI decoding process.

In other words, the AI up-scaler 236 is capable of using DNN setting information according to image-related information by matching the image-related information at the left of a table of FIG. 5 with the DNN setting information at the right of the table.

As shown in FIG. 5, when it is verified, from the information related to the first image 125, that the resolution of the first image 125 is SD, a bitrate of image data obtained as a result of performing first encoding on the first image 125 is 10 Mbps, and the first encoding is performed on the first image 125 via AV1 codec, the AI up-scaler 236 may use A DNN setting information among the plurality of DNN setting information.

Also, when it is verified, from the information related to the first image 125, that the resolution of the first image 125 is HD, the bitrate of the image data obtained as the result of performing the first encoding is 15 Mbps, and the first encoding is performed on the first image 125 via H.264 codec, the AI up-scaler 236 may use B DNN setting information among the plurality of DNN setting information.

Also, when it is verified, from the information related to the first image 125, that the resolution of the first image 125 is full HD, the bitrate of the image data obtained as the result of performing the first encoding on the first image 125 is 20 Mbps, and the first encoding is performed on the first image 125 via HEVC codec, the AI up-scaler 236 may use C DNN setting information among the plurality of DNN setting information. When it is verified, from the information related to the first image 125, that the resolution of the first image 125 is full HD, the bitrate of the image data obtained as the result of performing the first encoding on the first image 125 is 15 Mbps, and the first encoding is performed on the first image 125 via HEVC codec, the AI up-scaler 236 may use D DNN setting information among the plurality of DNN setting information. One of the C DNN setting information and the D DNN setting information is selected based on whether the bitrate of the image data obtained as the result of performing the first encoding on the first image 125 is 20 Mbps or 15 Mbps. The different bitrates of the image data, obtained when the first encoding is performed on the first image 125 of the same resolution via the same codec, indicates different qualities of reconstructed images. Accordingly, a first DNN and a second DNN may be jointly trained based on a certain image quality, and accordingly, the AI up-scaler 236 may obtain DNN setting information according to a bitrate of image data indicating the quality of the second image 145.

According to another embodiment of the disclosure, the AI up-scaler 236 may obtain the DNN setting information for performing AI up-scaling on the third image 155 from among the plurality of DNN setting information considering both information (prediction mode information, motion information, quantization parameter information, and the like) provided from the first decoder 232 and the information related to the first image 125 included in the AI data. For example, the AI up-scaler 236 may receive quantization parameter information used during a first encoding process of the first image 125 from the first decoder 232, verify a bitrate of image data obtained as an encoding result of the first image 125 from AI data, and obtain DNN setting information corresponding to the quantization parameter information and the bitrate. Even when the bitrates are the same, the quality of reconstructed images may vary according to the complexity of an image. A bitrate is a value representing the entire first image 125 on which first encoding is performed, and the quality of each frame may vary even within the first image 125. Accordingly, DNN setting information more suitable for the third image 155 may be obtained when prediction mode information, motion information, and/or a quantization parameter obtainable for each frame from the first decoder 232 are/is considered together, compared to when only the AI data is used.

Also, according to an embodiment of the disclosure, the AI data may include an identifier of mutually agreed DNN setting information. An identifier of DNN setting information is information for distinguishing a pair of DNN setting information jointly trained between the first DNN and the second DNN, such that AI up-scaling is performed on the third image 155 to the up-scaling target corresponding to the down-scaling target of the first DNN. The AI up-scaler 236 may perform AI up-scaling on the third image 155 by using the DNN setting information corresponding to the identifier of the DNN setting information, after obtaining the identifier of the DNN setting information included in the AI data. For example, an identifier indicating each of the plurality of DNN setting information settable in the first DNN and an identifier indicating each of the plurality of DNN setting information settable in the second DNN may be previously designated. In this case, the same identifier may be designated for a pair of DNN setting information settable in each of the first DNN and the second DNN. The AI data may include an identifier of DNN setting information set in the first DNN for AI down-scaling of the second original image 115. In response to the AI data, the AI up-scaler 236 may perform AI up-scaling on the third image 155 by using the DNN setting information indicated by the identifier included in the AI data among the plurality of DNN setting information.

Also, according to an embodiment of the disclosure, the AI data may include the DNN setting information. The AI up-scaler 236 may perform AI up-scaling on the third image 155 by using the DNN setting information included in the AI data, after obtaining the DNN setting information.

According to an embodiment of the disclosure, when pieces of information (for example, the number of convolution layers, the number of filter kernels for each convolution layer, a parameter of each filter kernel, and the like) constituting the DNN setting information are stored in a form of a lookup table, the AI up-scaler 236 may obtain the DNN setting information by combining some values selected from the values in the lookup table, based on information included in the AI data, and perform AI up-scaling on the third image 155 by using the obtained DNN setting information.

According to an embodiment of the disclosure, when a structure of a DNN corresponding to the up-scaling target is determined, the AI up-scaler 236 may obtain the DNN setting information, for example, parameters of a filter kernel, corresponding to the determined structure of the DNN.

The AI up-scaler 236 obtains the DNN setting information of the second DNN through the AI data including information related to the first DNN, and performs AI up-scaling on the third image 155 through the second DNN set with the obtained DNN setting information, In this case, memory usage and throughput may be reduced compared to when features of the third image 155 are directly analyzed for up-scaling.

According to an embodiment of the disclosure, when the third image 155 includes a plurality of frames, the AI up-scaler 236 may independently obtain DNN setting information in units of a certain number of frames, or may obtain common DNN setting information for all of the plurality of frames.

Figure 6:
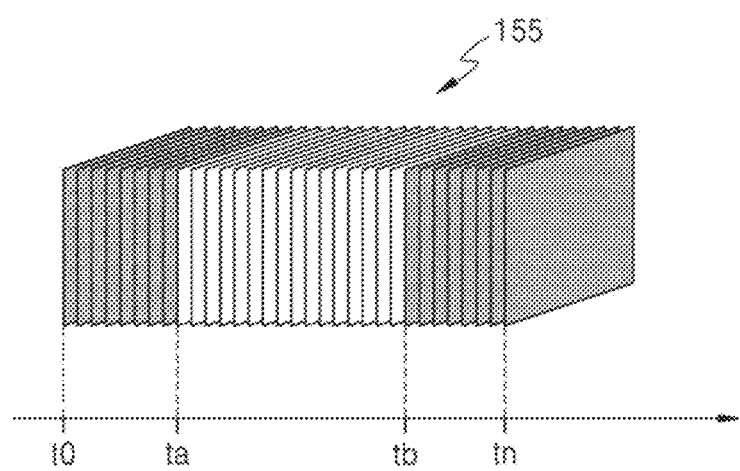
FIG. 6 is a diagram showing a third image including a plurality of frames.

FIG. 6 is a diagram showing the third image 155 including a plurality of frames.

As shown in FIG. 6, the third image 155 may include frames t0 through tn.

According to an embodiment of the disclosure, the AI up-scaler 236 may obtain DNN setting information of a second DNN through AI data, and perform AI up-scaling on the frames t0 through tn based on the obtained DNN setting information. In other words, the frames t0 through tn may be processed via AI up-scaling based on common DNN setting information.

According to another embodiment of the disclosure, the AI up-scaler 236 may perform AI up-scaling on some of the frames t0 through tn, for example, the frames t0 through ta, by using 'A' DNN setting information obtained from AI data, and perform AI up-scaling on the frames ta+1 through tb by using 'B' DNN setting information obtained from the AI data. Also, the AI up-scaler 236 may perform AI up-scaling on the frames tb+1 through tn by using 'C' DNN setting information obtained from the AI data. In other words, the AI up-scaler 236 may independently obtain DNN setting information for each group including a certain number of frames among the plurality of frames, and perform AI up-scaling on the frames included in each group by using the independently obtained DNN setting information.

According to another embodiment of the disclosure, the AI up-scaler 236 may independently obtain DNN setting information for each frame forming the third image 155. In other words, when the third image 155 includes three frames, the AI up-scaler 236 may perform AI up-scaling on a first frame by using DNN setting information obtained in relation to the first frame, perform AI up-scaling on a second frame by using DNN setting information obtained in relation to the second frame, and perform AI up-scaling on a third frame by using DNN setting information obtained in relation to the third frame. DNN setting information may be independently obtained for each frame included in the third image 155, according to a method of obtaining DNN setting information based on information (prediction mode information, motion information, quantization parameter information, or the like) provided from the first decoder 232 and information related to the first image 125 included in the AI data. This is because the mode information, the quantization parameter information, or the like may be determined independently for each frame included in the third image 155.

According to another embodiment of the disclosure, the AI data may include information indicating for up to which frame is DNN setting information valid, the DNN setting information having been obtained based on the AI data. For example, when the AI data includes information indicating that DNN setting information is valid for up to the frame ta, the AI up-scaler 236 performs AI up-scaling on the frames t0 through ta by using DNN setting information obtained based on the AI data. Also, when another piece of AI data includes information indicating that DNN setting information is valid for up to the frame tn, the AI up-scaler 236 performs AI up-scaling on the frames ta+1 through tn by using DNN setting information obtained based on the other piece of AI data.

The AI encoding apparatus 700 for performing AI encoding on the first original image 105 will now be described with reference to FIG. 7.

FIG. 7 is a block diagram of a configuration of the AI encoding apparatus 700 according to an embodiment of the disclosure.

Referring to FIG. 7, the AI encoding apparatus 700 may include an AI encoder 710 and a transmitter 730. The AI encoder 710 may include a pre-processor 712, an AI down-scaler 714, and a first encoder 716. The transmitter 730 may include a data processor 732 and a communication interface 734.

In FIG. 7, the AI encoder 710 and the transmitter 730 are illustrated as separate devices, but the AI encoder 710 and the transmitter 730 may be implemented through one processor. In this case, the AI encoder 710 and the transmitter 730 may be implemented through a dedicated processor or through a combination of software and a general-purpose processor such as an AP, a CPU or a GPU. The dedicated processor may be implemented by including a memory for implementing an embodiment of the disclosure or by including a memory processor for using an external memory.

Also, the AI encoder 710 and the transmitter 730 may be configured by a plurality of processors. In this case, the AI encoder 710 and the transmitter 730 may be implemented through a combination of dedicated processors or through a combination of software and a plurality of general-purpose processors such as an AP, a CPU, or a GPU. The pre-processor 712, the AI down-scaler 714, and the first encoder 714 may be implemented through different processors.

The pre-processor 712 performs pre-processing of changing the resolution of the first original image 105 according to an output resolution. The pre-processor 712 may change the resolution of the first original image 105 via legacy scaling. Here, the legacy scaling is scaling not using a neural network, and may include, for example, at least one of bilinear scaling, bicubic scaling, lanczos scaling, or stair step scaling. The legacy scaling may be also referred to as a non-AI scaling.

The pre-processor 712 determines the output resolution. The output resolution indicates or corresponds to the resolution of the first image 125 obtained by the AI down-scaler 714. The output resolution may refer to a resolution setting value that is applied to the AI down-scaler 714.

According to an embodiment of the disclosure, the pre-processor 712 may determine the output resolution according to an input from a user. In this embodiment, the input from the user may include a resolution setting value that is set by the user.

According to another embodiment of the disclosure, the pre-processor 712 may determine the output resolution according to the state of a network connected to the communication interface 734. In detail, the pre-processor 712 may determine the output resolution based on at least one of the bandwidth of the network or the congestion thereof. For example, when it is anticipated from the state of the network that a large capacity of data may be transmitted (e.g., when the available bandwidth is greater than a preset bandwidth), the pre-processor 712 may determine a relatively large output resolution. On the other hand, when it is anticipated from the state of the network that only a small capacity of data may be transmitted (e.g., when the available bandwidth is less than or equal to the preset bandwidth), the pre-processor 712 may determine a relatively small output resolution.

According to another embodiment of the disclosure, the pre-processor 712 may determine the output resolution, based on the performance of a display that reproduces an image. The performance of the display may include, for example, resolution expressible by the display, whether a decoding apparatus included in the display is able to perform AI up-scaling, a scaling factor of AI up-scaling when the AI up-scaling is possible, and whether the decoding apparatus is able to performing pre-processing.

The pre-processor 712 may receive performance information of the display from the display requesting the first original image 105 through the communication interface 734.

As described above, a decoding apparatus that receives the AI encoding data may perform the first AI decoding process of FIG. 1A, the second AI decoding process of FIG. 1B, or the general decoding process of FIG. 10. A method, performed by the pre-processor 712, of determining the output resolution for these decoding apparatuses will now be described in detail.

First, when a decoding apparatus that receives the AI encoding data is able to perform the first AI decoding process of FIG. 1A, the resolution of the second image 145 may be changed to an arbitrary resolution via pre-processing, and thus the pre-processor 712 may determine the output resolution by considering a network state. Because a decoding apparatus that receives the AI encoding data may arbitrarily change the resolution of the second image 145 according to the performance of a display connected to the decoding apparatus, the pre-processor 712 determines the output resolution by considering only a network state.

Next, when a decoding apparatus that receives the AI encoding data is able to perform the second AI decoding process of FIG. 1B, the resolution of the second image 145 may be changed according to a pre-determined scaling factor via AI up-scaling, and thus the pre-processor 712 may determine the output resolution by considering a network state, resolution reproducible by the display, and a scaling factor of the AI up-scaling. Because the resolution of the second image 145 is equal to that of the first image 125 and AI up-scaling is performed on the second image 145 according to the pre-determined scaling factor, the pre-processor 712 may set, as a maximum value of the output resolution, a value obtained by dividing maximum resolution reproducible by the display by the scaling factor of the AI up-scaling, and may determine a final output resolution in consideration of a network state within a range that is equal to or greater than the output resolution of the maximum value.

Next, when a decoding apparatus that receives the AI encoding data is able to perform the general decoding process of FIG. 10, the resolution of the second image 145 is not changed, and thus the pre-processor 712 may determine the output resolution by considering a network state and resolution reproducible by the display. Because the resolution of the second image 145 is equal to that of the first image 125, the pre-processor 712 may set maximum resolution reproducible by the display as a maximum value of the output resolution, and may determine a final output resolution in consideration of a network state within a range that is equal to or greater than the maximum value of the output resolution.

When the output resolution is determined, the pre-processor 712 obtains a target resolution of the second original image 115, based on the output resolution. Because the resolution of the first image 125 obtained via AI up-scaling needs to be equal to the output resolution, the pre-processor 712 may calculate the target resolution of the second original image 115 in consideration of a scaling factor of the AI down-scaler 714 and the output resolution. In detail, when the output resolution is a×b and the scaling factor is s (where s is a rational number smaller than 1), the pre-processor 712 may calculate the target resolution of the second original image 115 as (a/s)×(b/s).

The pre-processor 712 may change the resolution of the first original image 105 according to a ratio between the resolution of the first original image 105 and the target resolution such that the second original image 115 may have the target resolution.

The AI encoder 710 performs AI down-scaling on the second original image 115 and first encoding on the first image 125, and transmits AI data and image data to the transmitter 730. The transmitter 730 transmits the AI data and the image data to the AI decoding apparatus 200.

The image data includes data obtained as a result of performing the first encoding on the first image 125. The image data may include data obtained based on pixel values in the first image 125, for example, residual data that is a difference between the first image 125 and prediction data of the first image 125. Also, the image data includes information used during a first encoding process of the first image 125. For example, the image data may include prediction mode information, motion information, and quantization parameter information used to perform the first encoding on the first image 125, for example.

The AI data includes pieces of information enabling AI up-scaling to be performed on the third image 155 to an up-scaling target corresponding to a down-scaling target of a first DNN. According to an embodiment of the disclosure, the AI data may include difference information between the second original image 115 and the first image 125. Also, the AI data may include information related to the first image 125. The information related to the first image 125 may include information about at least one of resolution of the first image 125, a bitrate of the image data obtained as the result of performing first encoding on the first image 125 or a codec type used during the first encoding of the first image 125.

According to an embodiment of the disclosure, the AI data may include an identifier of mutually agreed DNN setting information such that the AI up-scaling is performed on the second image 155 to the up-scaling target corresponding to the down-scaling target of the first DNN.

Also, according to an embodiment of the disclosure, the AI data may include DNN setting information settable in a second DNN.

The AI down-scaler 714 may obtain the first image 125 obtained by performing the AI down-scaling on the second original image 115 through the first DNN. The AI down-scaler 712 may determine the down-scaling target of the second original image 115, based on a pre-determined standard.

In order to obtain the first image 125 matching the down-scaling target, the AI down-scaler 714 may store a plurality of DNN setting information settable in the first DNN. The AI down-scaler 714 obtains DNN setting information corresponding to the down-scaling target from among the plurality of DNN setting information, and performs the AI down-scaling on the second original image 115 through the first DNN set with the obtained DNN setting information.

Each of the plurality of DNN setting information may be trained to obtain the first image 125 of pre-determined resolution and/or pre-determined quality. For example, any one piece of DNN setting information among the plurality of DNN setting information may include pieces of information for obtaining the first image 125 of resolution that is half resolution of the second original image 115, for example, the first image 125 of 2 K (2048×1080) that is half of 4 K (4096×2160) of the second original image 115, and another piece of DNN setting information may include information for obtaining the first image 125 of resolution that is quarter resolution of the second original image 115, for example, the first image 125 of 2 K (2048×1080) that is quarter of 8 K (8192×4320) of the second original image 115.

According to an embodiment of the disclosure, when pieces of information (for example, the number of convolution layers, the number of filter kernels for each convolution layer, a parameter of each filter kernel, and the like) constituting the DNN setting information are stored in a form of a lookup table, the AI down-scaler 714 may obtain the DNN setting information by combining some values selected from the values in the lookup table, based on the down-scaling target, and perform AI down-scaling on the first original image 115 by using the obtained DNN setting information.

According to an embodiment of the disclosure, the AI down-scaler 714 may determine a structure of a DNN corresponding to the down-scaling target, and obtain DNN setting information corresponding to the determined structure of the DNN, for example, obtain parameters of a filter kernel.

The plurality of DNN setting information for performing the AI down-scaling on the second original image 115 may have an optimized value as the first DNN and the second DNN are jointly trained. Here, each piece of DNN setting information includes at least one of the number of convolution layers included in the first DNN, the number of filter kernels for each convolution layer, or a parameter of each filter kernel.

The AI down-scaler 714 may set the first DNN with the DNN setting information selected to perform the AI down-scaling on the second original image 115 to obtain the first image 125 of certain resolution and/or certain quality through the first DNN. When the DNN setting information for performing the AI down-scaling on the second original image 115 is selected from the plurality of DNN setting information, each layer in the first DNN may process input data based on pieces of information included in the DNN setting information.

A method, performed by the AI down-scaler 714, of determining the down-scaling target will now be described. The down-scaling target may indicate, for example, by how much resolution is decreased from the second original image 115 to obtain the first image 125.

According to an embodiment of the disclosure, the AI down-scaler 714 may determine the down-scaling target based on at least one of a compression ratio (for example, a resolution difference between the second original image 115 and the first image 125, a target bitrate, or the like), a compression quality (for example, a type of bitrate), compression history information, or a type of the second original image 115.

For example, the AI down-scaler 714 may determine the down-scaling target based on the compression ratio, the compression quality, or the like, which is pre-set or input from a user.

As another example, the AI down-scaler 714 may determine the down-scaling target by using the compression history information stored in the AI encoding apparatus 700. For example, according to the compression history information usable by the AI encoding apparatus 700, an encoding quality, a compression ratio, or the like preferred by the user may be determined, and the down-scaling target may be determined according to the encoding quality determined based on the compression history information. For example, the resolution, quality, or the like of the first image 125 may be determined according to the encoding quality that has been used most often according to the compression history information.

As another example, the AI down-scaler 714 may determine the down-scaling target based on the encoding quality that has been used more frequently than a certain threshold value (for example, an average quality of the encoding quality that has been used more frequently than the certain threshold value), according to the compression history information.

As another example, the AI down-scaler 714 may determine the down-scaling target, based on the resolution, type (for example, a file format), or the like of the second original image 115.

According to an embodiment of the disclosure, when the second original image 115 includes a plurality of frames, the AI down-scaler 714 may independently determine a down-scaling target in units of a certain number of frames, or may determine a common down-scaling target for all of the plurality of frames.

According to an embodiment of the disclosure, the AI down-scaler 714 may divide the frames included in the second original image 115 into a certain number of groups, and independently determine the down-scaling target for each group. The same or different down-scaling targets may be determined for each group. The numbers of frames included in the groups may be the same or different according to each group.

According to another embodiment of the disclosure, the AI down-scaler 714 may independently determine a down-scaling target for each frame included in the second original image 115. The same or different down-scaling targets may be determined for each frame.

An example of a structure of a first DNN 800 on which AI down-scaling is based will now be described.

Figure 8:
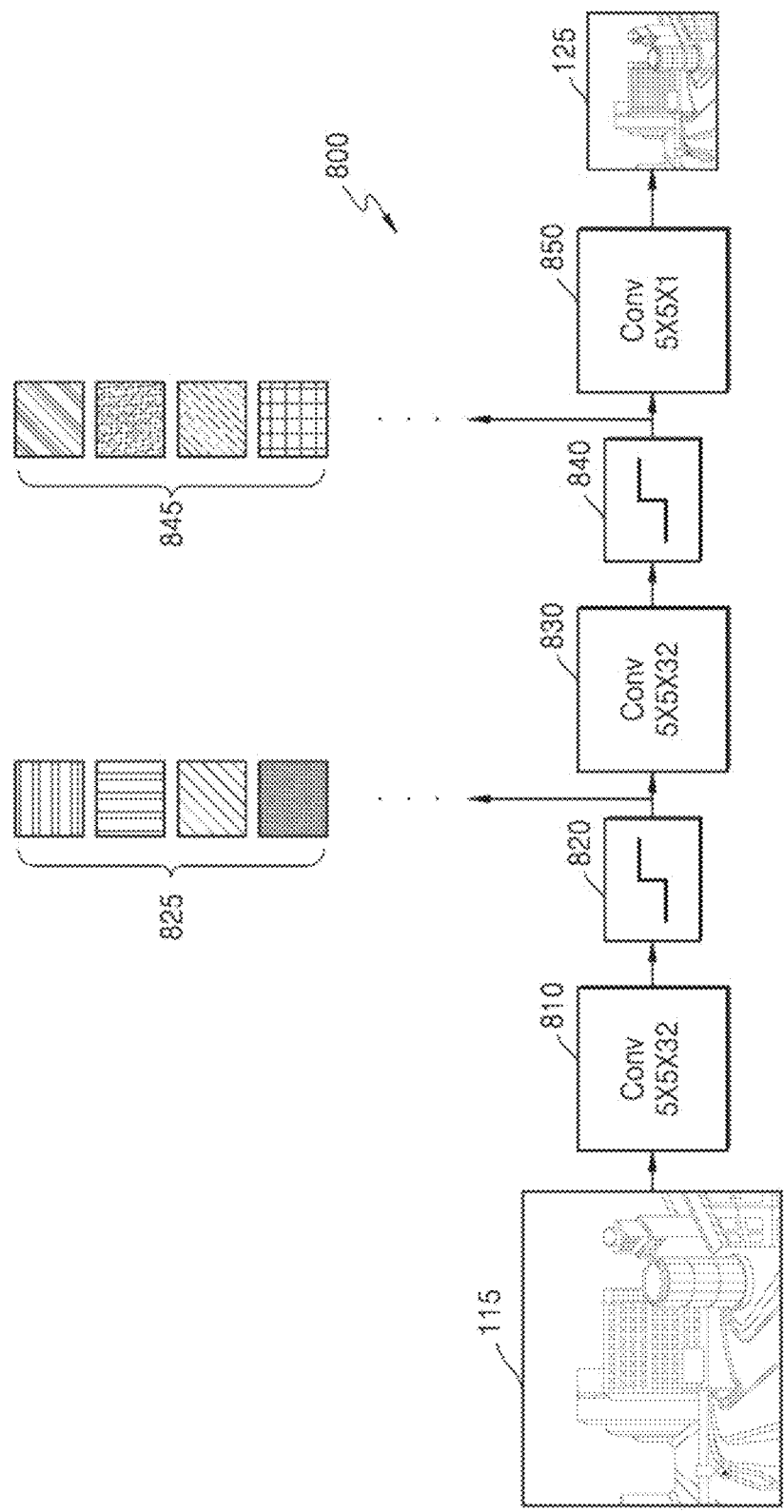
FIG. 8 is a diagram showing a first DNN for performing AI down-scaling on a second original image.

FIG. 8 is a diagram showing the first DNN 800 for performing AI down-scaling on the second original image 115.

As shown in FIG. 8, the second original image 115 is input to a first convolution layer 810. The first convolution layer 810 performs a convolution process on the second original image 115 by using 32 filter kernels having a size of 5×5. 32 feature maps generated as a result of the convolution process are input to a first activation layer 820. The first activation layer 820 may assign a non-linear feature to the 32 feature maps.

The first activation layer 820 determines whether to transmit sample values of the feature maps output from the first convolution layer 810 to a second convolution layer 830. For example, some of the sample values of the feature maps are activated by the first activation layer 820 and transmitted to the second convolution layer 830, and some of the sample values are deactivated by the first activation layer 820 and not transmitted to the second convolution layer 830. Information represented by the feature maps output from the first convolution layer 810 is emphasized by the first activation layer 820.

An output 825 of the first activation layer 820 is input to a second convolution layer 830. The second convolution layer 830 performs a convolution process on input data by using 32 filter kernels having a size of 5×5. 32 feature maps output as a result of the convolution process are input to a second activation layer 840, and the second activation layer 840 may assign a non-linear feature to the 32 feature maps.

An output 845 of the second activation layer 840 is input to a third convolution layer 850. The third convolution layer 850 performs a convolution process on input data by using one filter kernel having a size of 5×5. As a result of the convolution process, one image may be output from the third convolution layer 850. The third convolution layer 850 is a layer for outputting a final image, and obtains one output by using one filter kernel. According to an embodiment of the disclosure, the third convolution layer 850 may output the first image 125 as a result of a convolution operation.

There may be a plurality of DNN setting information indicating the numbers of filter kernels of the first, second, and third convolution layers 810, 830, and 850 of the first DNN 800, parameters of the filter kernels of the first, second, and third convolution layers 810, 830, and 850 of the first DNN 800, and the like, and the plurality of DNN setting information needs to be connected to a plurality of DNN setting information of a second DNN. The connection between the plurality of DNN setting information of the first DNN and the plurality of DNN setting information of the second DNN may be realized via joint training of the first DNN and the second DNN.

In FIG. 8, the first DNN 800 includes three convolution layers, namely, the first, second, and third convolution layers 810, 830, and 850, and two activation layers, namely, the first and second activation layers 820 and 840, but this is only an example, and the numbers of convolution layers and activation layers may vary according to an embodiment of the disclosure. Also, according to an embodiment of the disclosure, the first DNN 800 may be implemented as a recurrent neural network (RNN). In this case, a convolutional neural network (CNN) structure of the first DNN 800 according to an embodiment of the disclosure is changed to an RNN structure.

According to an embodiment of the disclosure, the AI up-scaler 714 may include at least one ALU for the convolution operation and the operation of the activation layer. The ALU may be implemented as a processor. For the convolution operation, the ALU may include a multiplier that performs multiplication between sample values of the second original image 115 or the feature map output from a previous layer and sample values of the filter kernel, and an adder that adds result values of the multiplication. Also, for the operation of the activation layer, the ALU may include a multiplier that multiplies an input sample value by a weight used in a pre-determined sigmoid function, a Tanh function, or an ReLU function, and a comparator that compares a multiplication result and a certain value to determine whether to transmit the input sample value to a next layer.

Referring back to FIG. 7, upon receiving the first image 125 from the AI down-scaler 714, the first encoder 716 may reduce an information amount of the first image 125 by performing first encoding on the first image 125. The image data corresponding to the first image 125 may be obtained as a result of performing the first encoding by the first encoder 716.

The data processor 732 processes at least one of the AI data or the image data to be transmitted in a certain form. For example, when the AI data and the image data are to be transmitted in a form of a bitstream, the data processor 732 processes the AI data to be expressed in a form of a bitstream and transmits the image data and the AI data in a form of one bitstream through the communication interface 734. As another example, the data processor 732 processes the AI data to be expressed in a form of bitstream, and transmits each of a bitstream corresponding to the AI data and a bitstream corresponding to the image data through the communication interface 734. As another example, the data processor 732 processes the AI data to be expressed in a form of a frame or packet, and transmits the image data in a form of a bitstream and the AI data in a form of a frame or packet through the communication interface 734.

The communication interface 734 transmits the AI encoding data obtained as the result of AI encoding through a network. The AI encoding data obtained as the result of AI encoding includes the image data and the AI data. The image data and the AI data may be transmitted through a same type of network or different types of networks.

According to an embodiment of the disclosure, the AI encoding data obtained as a result of processes of the data processor 732 may be stored in a data storage medium including a magnetic medium such as a hard disk, a floppy disk, or a magnetic tape, an optical recording medium such as CD-ROM or DVD, or a magneto-optical medium such as a floptical disk.

A method of jointly training the first DNN 800 and the second DNN 300 will now be described with reference to FIG. 9.

Figure 9:
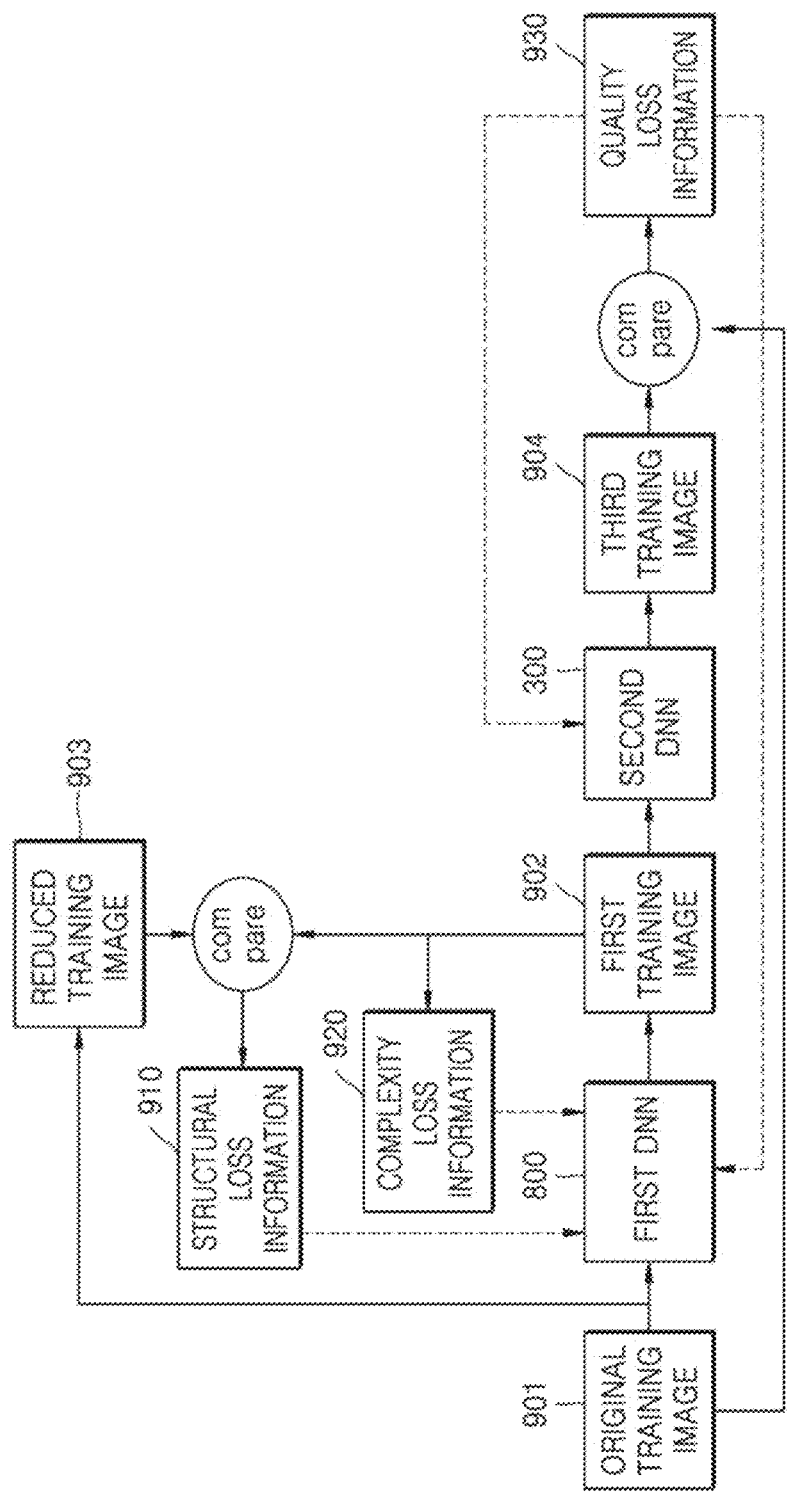
FIG. 9 is a diagram for describing a method of training a first DNN and a second DNN.

FIG. 9 is a diagram for describing a method of training the first DNN 800 and the second DNN 300.

In an embodiment of the disclosure, the first original image 105 on which AI encoding is performed through an AI encoding process is reconstructed to the fourth image 165 via an AI decoding process, and, in order to maintain similarity between the fourth image 165 obtained as a result of AI decoding and the first original image 105, connectivity between the AI encoding process and the AI decoding process is required. In other words, information lost in the AI encoding process needs to be reconstructed during the AI decoding process, and, to this end, the first DNN 800 and the second DNN 300 need to be jointly trained.

For accurate AI decoding, ultimately, quality loss information 930 corresponding to a result of comparing a third training image 904 and an original training image 901 shown in FIG. 9 needs to be reduced. Accordingly, the quality loss information 930 is used to train both of the first DNN 800 and the second DNN 300.

First, a training process shown in FIG. 9 will be described.

In FIG. 9, the original training image 901 is an image on which AI down-scaling is to be performed, and a first training image 902 is an image obtained by performing AI down-scaling on the original training image 901. Also, the third training image 904 is an image obtained by performing AI up-scaling on the first training image 902.

The original training image 901 includes a still image or a moving image including a plurality of frames. According to an embodiment of the disclosure, the original training image 901 may include a luminance image extracted from the still image or the moving image including the plurality of frames. According to an embodiment of the disclosure, the original training image 901 may include a patch image extracted from the still image or the moving image including the plurality of frames. When the original training image 901 includes the plurality of frames, the first training image 902, a second training image (not shown), and the third training image 904 also each include a plurality of frames. When the plurality of frames of the original training image 901 are sequentially input to the first DNN 800, the plurality of frames of the first training image 902, the second training image, and the third training image 904 may be sequentially obtained through the first DNN 800 and the second DNN 300.

For joint training of the first DNN 800 and the second DNN 300, the original training image 901 is input to the first DNN 800. The original training image 901 input to the first DNN 800 is output as the first training image 902 via the AI down-scaling, and the first training image 902 is input to the second DNN 300. The third training image 904 is output as a result of performing the AI up-scaling on the first training image 902.

Referring to FIG. 9, the first training image 902 is input to the second DNN 300. According to an embodiment of the disclosure, a second training image obtained as first encoding and first decoding are performed on the first training image 902 may be input to the second DNN 300. In order to input the second training image to the second DNN 300, any one codec among MPEG-2, H.264, MPEG-4, HEVC, VC-1, VP8, VP9, and AV1 may be used. In detail, any one codec among MPEG-2, H.264, MPEG-4, HEVC, VC-1, VP8, VP9, and AV1 may be used to perform first encoding on the first training image 902 and first decoding on image data corresponding to the first training image 902.

Referring to FIG. 9, separate from the first training image 902 being output through the first DNN 800, a reduced training image 903 is obtained by performing legacy down-scaling on the original training image 901. Here, the legacy down-scaling may include at least one of bilinear scaling, bicubic scaling, lanczos scaling, or stair step scaling.

In order to prevent a structural feature of the first image 125 from deviating greatly from a structural feature of the first original image 105 or the second original image 115, the reduced training image 903 is obtained to preserve the structural feature of the original training image 901.

Before training is performed, the first DNN 800 and the second DNN 300 may be set with pre-determined DNN setting information. When the training is performed, structural loss information 910, complexity loss information 920, and the quality loss information 930 may be determined.

The structural loss information 910 may be determined based on a result of comparing the reduced training image 903 and the first training image 902. For example, the structural loss information 910 may correspond to a difference between structural information of the reduced training image 903 and structural information of the first training image 902. Structural information may include various features extractable from an image, such as luminance, contrast, histogram, or the like of the image. The structural loss information 910 indicates how much structural information of the original training image 901 is maintained in the first training image 902. When the structural loss information 910 is small, the structural information of the first training image 902 is similar to the structural information of the original training image 901.

The complexity loss information 920 may be determined based on spatial complexity of the first training image 902. For example, a total variance value of the first training image 902 may be used as the spatial complexity. The complexity loss information 920 is related to a bitrate of image data obtained by performing first encoding on the first training image 902. It is defined that the bitrate of the image data is low when the complexity loss information 920 is small.

The quality loss information 930 may be determined based on a result of comparing the original training image 901 with the third training image 904. The quality loss information 930 may include at least one of an L1-norm value, an L2-norm value, an Structural Similarity (SSIM) value, a Peak Signal-To-Noise Ratio-Human Vision System (PSNR-HVS) value, an Multiscale SSIM (MS-SSIM) value, a Variance Inflation Factor (VIF) value, or a Video Multimethod Assessment Fusion (VMAF) value regarding the difference between the original training image 901 and the third training image 904. The quality loss information 930 indicates how much the third training image 904 is similar to the original training image 901. The third training image 904 is more similar to the original training image 901 when the quality loss information 930 is small.

Referring to FIG. 9, the structural loss information 910, the complexity loss information 920, and the quality loss information 930 are used to train the first DNN 800, and the quality loss information 930 may be used to train the second DNN 300. In other words, the quality loss information 930 is used to train both the first and second DNNs 800 and 300.

The first DNN 800 may update a parameter such that final loss information determined based on the structural loss information 910, the complexity loss information 920, and the quality loss information 930 is reduced or minimized. Also, the second DNN 300 may update a parameter such that the quality loss information 930 is reduced or minimized.

The final loss information for training the first DNN 800 and the second DNN 300 may be determined as Equation 1 below.

$$\text{Loss}DS = a \times \text{structural loss information} + b \times \text{complexity loss information} + c \times \text{quality loss information}$$

$$\text{Loss}US = d \times \text{quality loss information} \quad \text{[Equation 1]}$$

In Equation 1, LossDS indicates final loss information to be reduced or minimized to train the first DNN 800, and LossUS indicates final loss information to be reduced or minimized to train the second DNN 300. Also, a, b, c and d may correspond to pre-determined certain weights.

In other words, the first DNN 800 updates parameters in a direction where LossDS of Equation 1 is reduced, and the second DNN 300 updates parameters in a direction where LossUS is reduced. When the parameters of the first DNN 800 are updated according to LossDS derived during the training, the first training image 902 obtained based on the updated parameters becomes different from a previous first training image 902 obtained during previous training, and accordingly, the third training image 904 also becomes different from a previous third training image 904 obtained during the previous training. When the third training image 904 becomes different from the previous third training image 904, the quality loss information 930 is also newly determined, and the second DNN 300 updates the parameters accordingly. When the quality loss information 930 is newly determined, LossDS is also newly determined, and the first DNN 800 updates the parameters according to the newly determined LossDS. In other words, updating of the parameters of the first DNN 800 leads to updating of the parameters of the second DNN 300, and the updating of the parameters of the second DNN 300 leads to updating of the parameters of the first DNN 800. In other words, because the first DNN 800 and the second DNN 300 are jointly trained by sharing the quality loss information 830, the parameters of the first DNN 800 and the parameters of the second DNN 300 may be jointly optimized.

Referring to Equation 1, it is verified that LossUS is determined according to the quality loss information 930, but this is only an example. LossUS may be determined based on at least one of the structural loss information 910 or the complexity loss information 920, and the quality loss information 930. It is also verified that LossDS is determined according to the structural loss information 910, the complexity loss information 920, and the quality loss information 930, but this is only an example. LossDS may be determined based on a combination of some of the structural loss information 910, the complexity loss information 920, and the quality loss information 930. For example, LossDS may be determined based on a combination of the structural loss information 910 and the quality loss information 930.

It has been described above that the AI up-scaler 236 of the AI decoding apparatus 200 and the AI down-scaler 714 of the AI encoding apparatus 700 store the plurality of DNN setting information, and methods of training each of the plurality of DNN setting information stored in the AI up-scaler 236 and the AI down-scaler 714 will now be described.

As described with reference to Equation 1, the first DNN 800 updates the parameters considering the similarity (the structural loss information 910) between the structural information of the first training image 902 and the structural information of the original training image 901, the bitrate (the complexity loss information 920) of the image data obtained as a result of performing first encoding on the first training image 902, and the difference (the quality loss information 930) between the third training image 904 and the original training image 901.

In detail, the parameters of the first DNN 800 may be updated such that the first training image 902 having similar structural information as the original training image 901 is obtained and the image data having a small bitrate is obtained when first encoding is performed on the first training image 902, and at the same time, the second DNN 300 performing AI up-scaling on the first training image 902 may obtain the third training image 904 similar to the original training image 901.

A direction in which the parameters of the first DNN 800 are optimized varies by adjusting the weights a, b, and c of Equation 1. For example, when the weight b is determined to be high, the parameters of the first DNN 800 may be updated by prioritizing a low bitrate over the high quality of the third training image 904. Also, when the weight c is determined to be high, the parameters of the first DNN 800 may be updated by prioritizing high quality of the third training image 904 over a high bitrate or maintenance of the structural information of the original training image 901.

Also, the direction in which the parameters of the first DNN 800 are optimized may vary according to a type of codec used to perform first encoding on the first training image 902. This is because the second training image to be input to the second DNN 300 may vary according to the type of codec.

In other words, the parameters of the first DNN 800 and the parameters of the second DNN 300 may be jointly updated based on the weights a, b, and c, and the type of codec for performing first encoding on the first training image 902. Accordingly, when the first DNN 800 and the second DNN 300 are trained after determining the weights a, b, and c each to be a certain value and determining the type of codec to be a certain type, the parameters of the first DNN 700 and the parameters of the second DNN 300 connected and optimized to each other may be determined. Also, when the first DNN 700 and the second DNN 300 are trained after changing the weights a, b, and c, and the type of codec, the parameters of the first DNN 700 and the parameters of the second DNN 300 connected and optimized to each other may be determined. In other words, the plurality of DNN setting information jointly trained with each other may be determined in the first DNN 800 and the second DNN 300 when the first DNN 800 and the second DNN 300 are trained while changing values of the weights a, b, and c, and the value of each type of codec.

As described above with reference to FIG. 5, the plurality of DNN setting information of the first DNN 800 and the second DNN 300 may be mapped to the pieces of information related to the first image. To set such a mapping relationship, first encoding may be performed on the first training image 902 output from the first DNN 800 via a certain codec according to a certain bitrate and the second training image obtained by performing first decoding on a bitstream obtained as a result of performing the first encoding may be input to the second DNN 300. In other words, by training the first DNN 800 and the second DNN 300 after setting an environment such that the first encoding is performed on the first training image 902 of a certain resolution via the certain codec according to the certain bitrate, a DNN setting information pair mapped to the resolution of the first training image 902, a type of the codec used to perform the first encoding on the first training image 902, and the bitrate of the bitstream obtained as a result of performing the first encoding on the first training image 902 may be determined. By variously changing the resolution of the first training image 902, the type of codec used to perform the first encoding on the first training image 902, and the bitrate of the bitstream obtained according to the first encoding of the first training image 902, the mapping relationships between the plurality of DNN setting information of the first DNN 800 and the second DNN 300 and the pieces of information related to the first image 125 may be determined.

FIG. 10 is a diagram for describing training processes of the first DNN 800 and the second DNN 300 by a training apparatus 1000.

The training of the first DNN 800 and the second DNN 300 described above with reference FIG. 9 may be performed by the training apparatus 1000. The training apparatus 1000 may include the first DNN 800 and the second DNN 300. The training apparatus 1000 may be, for example, the AI encoding apparatus 700 or a separate server. The DNN setting information of the second DNN 300 obtained as the training result may be stored in the AI decoding apparatus 200.

Referring to FIG. 10, the training apparatus 1000 initially sets DNN setting information of the first DNN 800 and the second DNN 300, in operations S1040 and S1045. Accordingly, the first DNN 800 and the second DNN 300 may operate according to pre-determined DNN setting information. The DNN setting information may include information about at least one of the number of convolution layers included in the first DNN 800 and the second DNN 300, the number of filter kernels for each convolution layer, the size of a filter kernel for each convolution layer, or a parameter of each filter kernel.

The training apparatus 1000 inputs the original training image 901 into the first DNN 800, in operation S1050. The original training image 901 may include a still image or at least one frame included in a moving image.

The first DNN 800 processes the original training image 901 according to the initially set DNN setting information and outputs the first training image 902 obtained by performing AI down-scaling on the original training image 901, in operation S1055. In FIG. 10, the first training image 902 output from the first DNN 800 is directly input to the second DNN 300. However, the first training image 902 output from the first DNN 800 may be input to the second DNN 300 by the training apparatus 1000. Also, the training apparatus 1000 may perform first encoding and first decoding on the first training image 902 via a certain codec, and then input the second training image to the second DNN 300.

The second DNN 300 processes the first training image 902 or the second training image according to the initially set DNN setting information and outputs the third training image 904 obtained by performing AI up-scaling on the first training image 902 or the second training image, in operation S1060.

The training apparatus 1000 calculates the complexity loss information 920, based on the first training image 902, in operation S1065.

The training apparatus 1000 calculates the structural loss information 910 by comparing the reduced training image 903 and the first training image 902, in operation S1070.

The training apparatus 1000 calculates the quality loss information 930 by comparing the original training image 901 and the third training image 904, in operation S1075.

According to an embodiment of the disclosure, the training apparatus 1000 may use at least one of the complexity loss information 920, the structural loss information 910, or the quality loss information 930 to calculate the final loss information.

The first DNN 800 may update the initially set DNN setting information via a back propagation process based on the final loss information calculated based on at least one of the complexity loss information 920, the structural loss information 910, or the quality loss information 930, in operation S1080.

The second DNN 300 updates the initially set DNN setting information via a back propagation process based on the quality loss information 930 or the final loss information, in operation S1085.

Then, the training apparatus 1000, the first DNN 800, and the second DNN 300 repeat operations S1050 through S1085 until pieces of final loss information are minimized, to update the DNN setting information. At this time, during each repetition, the first DNN 800 and the second DNN 300 operate according to the DNN setting information updated in the previous operation.

Figure 11:
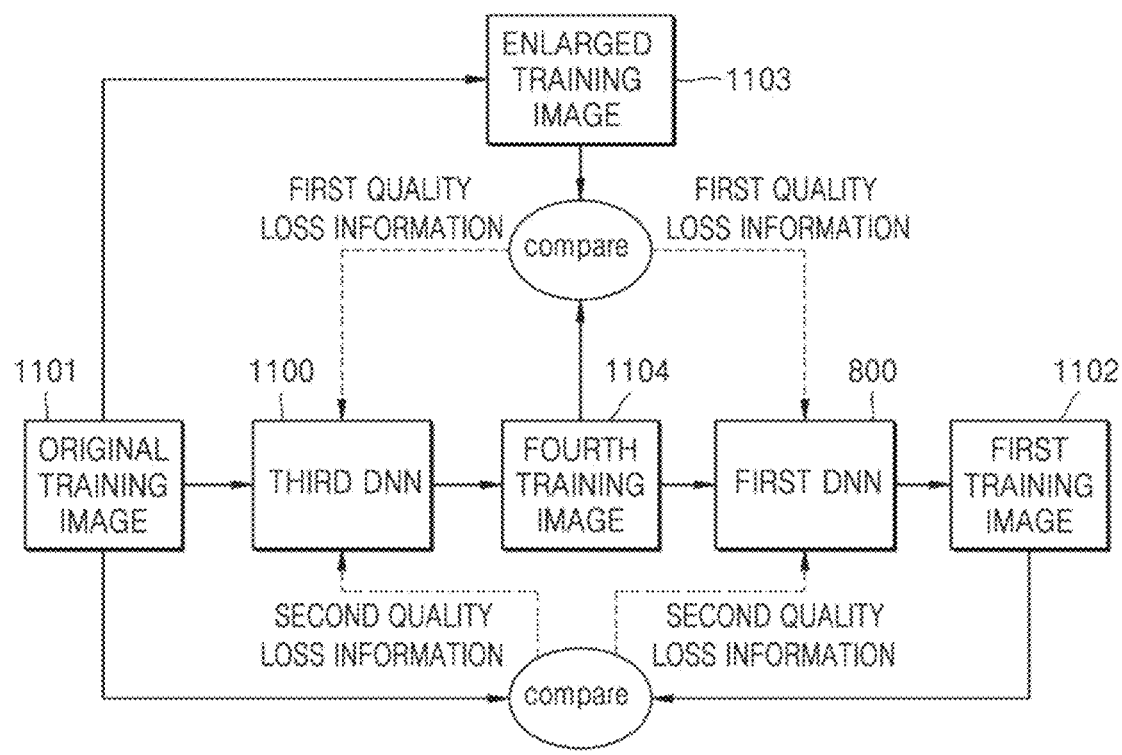
FIG. 11 is a diagram for explaining another method of training a first DNN.
Figure 12:
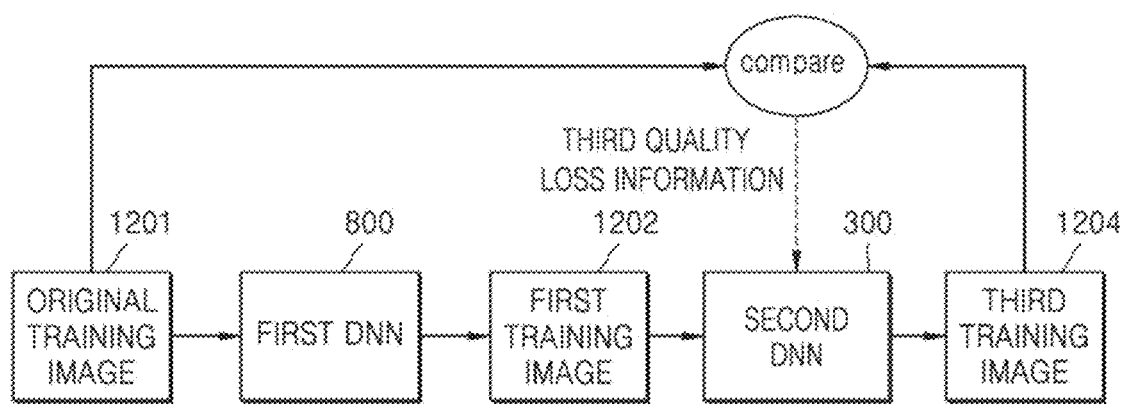
FIG. 12 is a diagram for explaining another method of training a second DNN.

FIGS. 11 and 12 are diagrams for describing methods of training the first DNN 800 and the second DNN 300.

In the training method of the first DNN 800 and the second DNN 300 described above with reference to FIG. 9, updating of the parameter of the first DNN 800 and updating of the parameter of the second DNN 300 are performed simultaneously in one training process. However, in the training methods of FIGS. 11 and 12, after training of the first DNN 800 is completed, the second DNN 300 is trained.

Referring to FIG. 11, an original training image 1101 is input to a third DNN 1100, and a fourth training image 1104 is obtained by performing AI up-scaling on the original training image 1101 by using the third DNN 1100. The original training image 1101 includes a still image or a moving image including a plurality of frames. According to an embodiment of the disclosure, the original training image 1101 may include a luminance image extracted from the still image or the moving image including the plurality of frames. According to an embodiment of the disclosure, the original training image 1101 may include a patch image extracted from the still image or the moving image including the plurality of frames. When the original training image 1101 includes the plurality of frames, the fourth training image 1104, a first training image 1102, and an enlarged training image 1103 also each include a plurality of frames.

The third DNN 1100 increases the resolution of the original training image 1101. The third DNN 1100 is used in training the first DNN 800, and thus may be the same as or different from the second DNN 300 used by the AI decoding apparatus 200 to perform AI up-scaling.

Separate from the fourth training image 1104 being obtained through the third DNN 1100, the enlarged training image 1103 is obtained by performing legacy down-scaling on the original training image 1101. Here, the legacy up-scaling may include at least one of bilinear scaling, bicubic scaling, lanczos scaling, or stair step scaling.

In order to prevent a structural feature of the first image 125 from deviating greatly from a structural feature of the first original image 105 or the second original image 115, the enlarged training image 1103 is obtained to preserve the structural feature of the original training image 1101.

The fourth training image 1104 is input to the first DNN 800, and the first training image 1102 is obtained by performing AI down-scaling by using the first DNN 800.

First quality loss information corresponding to a difference between the enlarged training image 1103 and the fourth training image 1104, and second quality loss information corresponding to a difference between the original training image 1101 and the first training image 1102 are input to the first DNN 800 and the third DNN 1100. Each of the difference between the enlarged training image 1103 and the fourth training image 1104 and the difference between the original training image 1101 and the first training image 1102 may include at least one of an L1-norm value, an L2-norm value, an Structural Similarity (SSIM) value, a Peak Signal-To-Noise Ratio-Human Vision System (PSNR- HVS) value, an Multiscale SSIM (MS-SSIM) value, a Variance Inflation Factor (VIF) value, or a Video Multimethod Assessment Fusion (VMAF) value.

The parameters of the first DNN 800 and the third DNN 1100 are updated such that final loss information obtained by combining the first quality loss information with the second quality loss information is reduced or minimized.

When training of the first DNN 800 is completed, the second DNN 300 is trained, as described above with reference to FIG. 12.

Referring to FIG. 12, an original training image 1201 is input to the first DNN 800, and a first training image 1202 is obtained by performing AI down-scaling on the original training image 1201 by using the first DNN 800. The original training image 1201 of FIG. 12 may correspond to the original training image 1101 or the fourth training image 1104 of FIG. 11.

The first training image 1202 is input to the second DNN 300, and a third training image 1204 is obtained by performing AI up-scaling by using the second DNN 300. According to an embodiment of the disclosure, a second training image obtained by performing first encoding and first decoding on the first training image 1202 may be input to the second DNN 300. In order to input the second training image to the second DNN 300, any one codec among MPEG-2, H.264, MPEG-4, HEVC, VC-1, VP8, VP9, and AV1 may be used. In detail, any one codec among MPEG-2, H.264, MPEG-4, HEVC, VC-1, VP8, VP9, and AV1 may be used to perform first encoding on the first training image 1202 and first decoding on image data corresponding to the first training image 1202.

Third quality loss information corresponding to a difference between the original training image 1201 and the third training image 1204 is input to the second DNN 300. Because training of the first DNN 800 has already been terminated, no loss information is input to the first DNN 800. The difference between the original training image 1201 and the third training image 1204 may include at least one of an L1-norm value, an L2-norm value, a Structural Similarity (SSIM) value, a Peak Signal-To-Noise Ratio-Human Vision System (PSNR-HVS) value, a Multiscale SSIM (MS-SSIM) value, a Variance Inflation Factor (VIF) value, or a Video Multimethod Assessment Fusion (VMAF) value.

The parameter of the second DNN 300 is updated such the third quality loss information is reduced or minimized.

It has been described above that the AI up-scaler 236 of the AI decoding apparatus 200 and the AI down-scaler 714 of the AI encoding apparatus 700 store the plurality of DNN setting information mapped with each other, and methods of training each of the plurality of DNN setting information stored in the AI up-scaler 236 and the AI down-scaler 714 will now be described.

According to the training methods described with reference to FIGS. 11 and 12, when the DNN setting information is obtained as a result of training the first DNN 800, setting information of the second DNN 300 mapped with the DNN setting information of the first DNN 800 may be obtained via the training process of FIG. 12. Accordingly, when the first DNN 800 is trained while changing a training target during the training of the first DNN 800 and then the second DNN 300 is trained, a pair of DNN setting information mapped with each other could be obtained. For example, when the final loss information is calculated by combining the first quality loss information with the second quality loss information in FIG. 11, the training target of the first DNN 800 may be set according to adjustment of weights respectively applied to the first quality loss information and the second quality loss information. The pair of DNN setting information mapped with each other may be obtained by training the first DNN 800 according to the training target and then training the second DNN 300. A pair of DNN setting information corresponding to a training target obtained by changing the former training target and then training the first DNN 800 and the second DNN 300 may be obtained.

As another example, when the first DNN 800 is trained while changing conditions used during the training of the first DNN 800, for example, the resolution of the original training image 1101, the type of a subject included in the original training image 1101, and a legacy scaling method used to obtain the enlarged training image 1103, and then the second DNN 300 is trained, a pair of DNN setting information mapped with each other could be obtained.

According to another embodiment of the disclosure, to map the plurality of DNN setting information of the first DNN 800 and the second DNN 300 with the pieces of information related to the first image 125, first encoding may be performed on the first training image 1202 output from the first DNN 800 of FIG. 12 via a certain codec according to a certain bitrate, and the second training image obtained by performing first decoding on a bitstream obtained as a result of performing the first encoding may be input to the second DNN 300. In other words, by training the second DNN 300 after setting an environment such that the first encoding is performed on the first training image 1202 of a certain resolution via the certain codec according to the certain bitrate, a DNN setting information pair mapped to the resolution of the first training image 1202, a type of the codec used to perform the first encoding on the first training image 1202, and the bitrate of the bitstream obtained as a result of performing the first encoding on the first training image 1202 may be determined. By variously changing the resolution of the first training image 1202, the type of codec used to perform the first encoding on the first training image 1202, and the bitrate of the bitstream obtained according to the first encoding of the first training image 1202, the mapping relationships between the plurality of DNN setting information of the first DNN 800 and the second DNN 300 and the pieces of information related to the first image 125 may be determined.

In the training method of the first DNN 800 and the second DNN 300 described above with reference to FIG. 9, the reduced training image 903 obtained by performing legacy down-scaling on the original training image 901 is used. However, in the training methods of the first DNN 800 and the second DNN 300 described above with reference to FIGS. 11 and 12, the enlarged training image 1103 obtained by performing legacy up-scaling on the original training image 1101 is used. Because the enlarged training image 1103 obtained via legacy up-scaling includes the pixels of the original training image 1101 and additionally generated pixels, the enlarged training image 1103 may be favorable to original data preservation compared with legacy down-scaling that omits some of the pixels of the original training image 1101.

Figure 13:
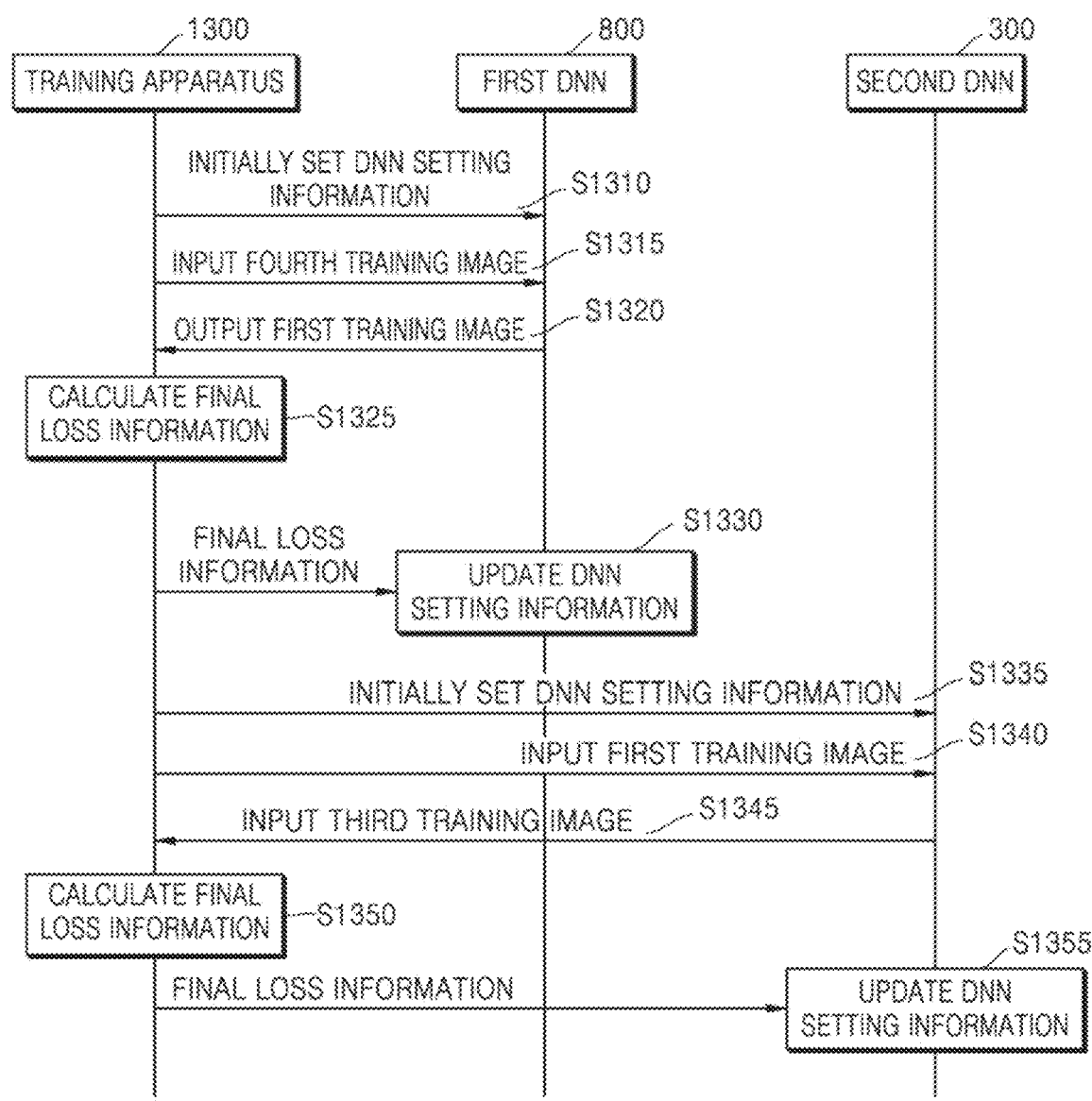
FIG. 13 is a diagram for describing training processes of a first DNN and a second DNN by a training apparatus.

FIG. 13 is a diagram for describing training processes of the first DNN 800 and the second DNN 300 by a training apparatus 1300.

The training of the first DNN 800 and the second DNN 300 described above with reference FIGS. 11 and 12 may be performed by the training apparatus 1300. The training apparatus 1300 may include the first DNN 800 and the second DNN 300. The training apparatus 1300 may be, for example, the AI encoding apparatus 700 or a separate server.

The DNN setting information of the second DNN 300 obtained as the training result may be stored in the AI decoding apparatus 200.

Referring to FIG. 13, the training apparatus 1300 initially sets DNN setting information of the first DNN 800, in operation S1310. Accordingly, the first DNN 800 may operate according to pre-determined DNN setting information. The DNN setting information may include information about at least one of the number of convolution layers included in the first DNN 800, the number of filter kernels for each convolution layer, the size of a filter kernel for each convolution layer, or a parameter of each filter kernel.

The training apparatus 1300 inputs, to the first DNN 800, the fourth training image 1104 obtained by performing up-scaling on the original training image 1101 by using the third DNN 1100, in operation S1315. The original training image 1101 may include a still image or at least one frame included in a moving image. The training apparatus 1300 may obtain the enlarged training image 1103 by performing legacy up-scaling on the original training image 1101.

The first DNN 800 processes the fourth training image 1104 according to the initially set DNN setting information and outputs the first training image 1102 obtained by performing AI up-scaling on the fourth training image 1104, in operation S1320.

The training apparatus 1300 may calculate the first quality loss information corresponding to the difference between the enlarged training image 1103 and the fourth training image 1104, and the second quality loss information corresponding to the difference between the original training image 1101 and the first training image 1102.

The first DNN 800 updates the initially set DNN setting information via a back propagation process based on the final loss information, in operation S1330. Then, the training apparatus 1300 and the first DNN 800 repeat operations S1315 through S1330 until the final loss information is minimized, to update the DNN setting information. At this time, during each repetition, the first DNN 800 operates according to the DNN setting information updated in the previous operation.

When training of the first DNN 800 is completed, the training apparatus 1300 initially sets DNN setting information of the second DNN 300, in operation S1335. Accordingly, the second DNN 300 may operate according to pre-determined DNN setting information. The DNN setting information may include information about at least one of the number of convolution layers included in the second DNN 300, the number of filter kernels for each convolution layer, the size of a filter kernel for each convolution layer, or a parameter of each filter kernel.

The training apparatus 1300 inputs, to the second DNN 300, the first training image 1202 obtained by performing AI down-scaling on the original training image 1201 by using the first DNN 800, in operation S1340. According to an embodiment of the disclosure, the second training image obtained by performing first encoding and first decoding on the first training image 1202 may be input to the second DNN 300.

The second DNN 300 processes the first training image 1202 according to the initially set DNN setting information and outputs the third training image 1204 obtained by performing AI up-scaling on the first training image 1202, in operation S1345.

The training apparatus 1300 calculates the final loss information corresponding to a difference between the original training image 1201 and the third training image 1204, in operation S1350.

The second DNN 300 updates the initially set DNN setting information via a back propagation process based on the final loss information, in operation S1355. Then, the training apparatus 1300 and the second DNN 300 repeat operations S1340 through S1355 until the final loss information is minimized, to update the DNN setting information. At this time, during each repetition, the second DNN 300 operates according to the DNN setting information updated in the previous operation.

Figure 14:
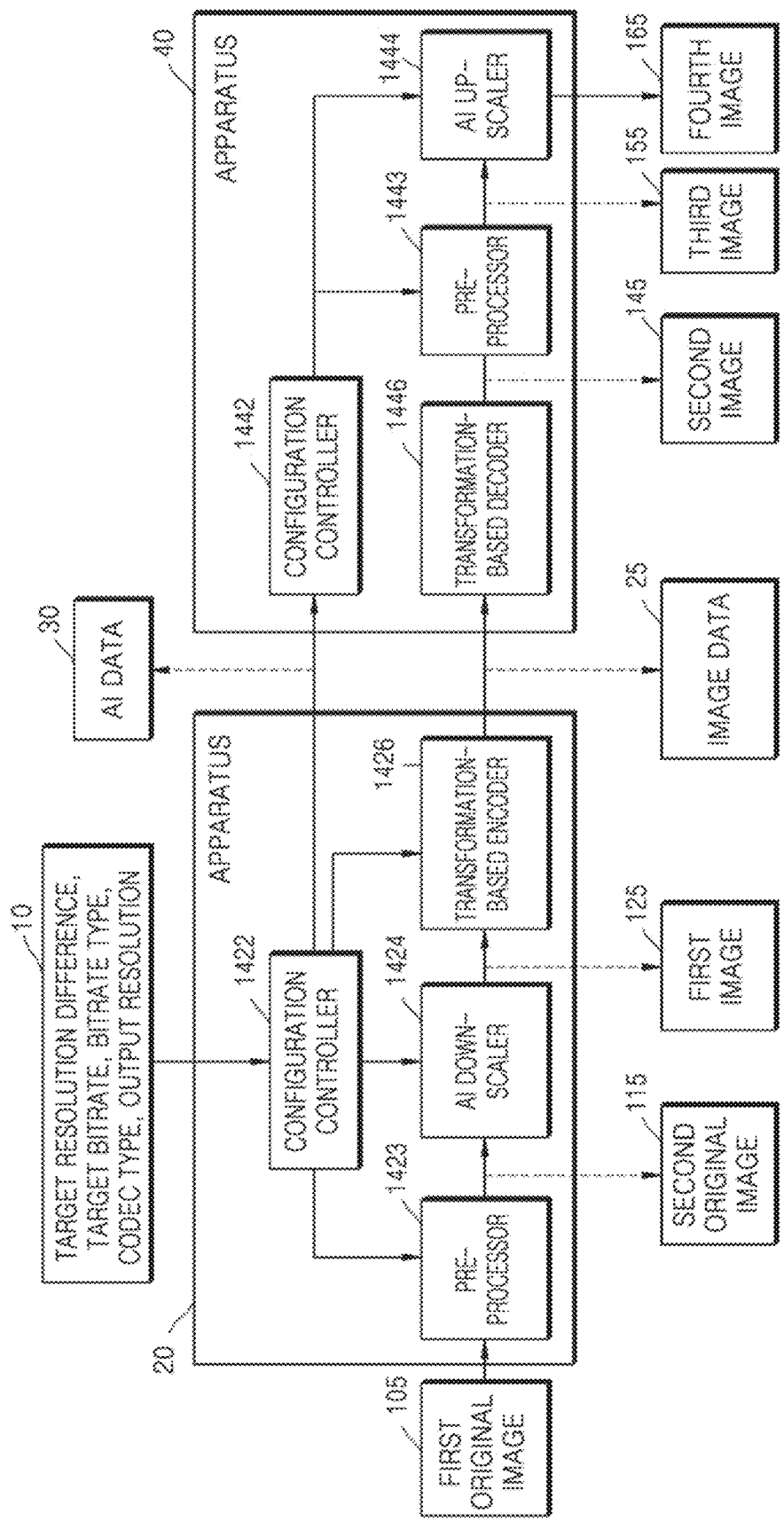
FIG. 14 is a diagram of an apparatus for performing AI down-scaling and an apparatus for performing AI up-scaling.

FIG. 14 is a diagram of an apparatus 20 for performing AI down-scaling on the first original image 105 and an apparatus 40 for performing AI up-scaling on the second image 145.

The apparatus 20 receives the first original image 105 and provides image data 25 and AI data 30 to the apparatus 40 by using a pre-processor 1423, an AI down-scaler 1424, and a transformation-based encoder 1426.

According to an embodiment of the disclosure, the image data 25 corresponds to the image data of FIG. 7 and the AI data 30 corresponds to the AI data of FIG. 7. Also, according to an embodiment of the disclosure, the pre-processor 1423, the transformation-based encoder 1426, and the AI down-scaler 1424 correspond to the pre-processor 712, the first encoder 716, and the AI down-scaler 714 of FIG. 7, respectively.

The apparatus 40 receives the AI data 30 and the image data 25 and obtains the fourth image 165 by using a transformation-based decoder 1446, a pre-processor 1443, and an AI up-scaler 1444. According to an embodiment of the disclosure, the transformation-based decoder 1446, the pre-processor 1443, and the AI up-scaler 1444 correspond to the first decoder 232, the pre-processor 234, and the AI up-scaler 236 of FIG. 2, respectively.

According to an embodiment of the disclosure, the apparatus 20 includes a CPU, a memory, and a computer program including instructions. The computer program is stored in the memory. According to an embodiment of the disclosure, the apparatus 20 performs functions to be described with reference to FIG. 14 according to execution of the computer program by the CPU. According to an embodiment of the disclosure, the functions to be described with reference to FIG. 14 are performed by a dedicated hardware chip and/or the CPU.

According to an embodiment of the disclosure, the apparatus 40 includes a CPU, a memory, and a computer program including instructions. The computer program is stored in the memory. According to an embodiment of the disclosure, the apparatus 40 performs functions to be described with reference to FIG. 14 according to execution of the computer program by the CPU. According to an embodiment of the disclosure, the functions to be described with reference to FIG. 14 are performed by a dedicated hardware chip and/or the CPU.

In FIG. 14, a configuration controller 1422 receives at least one input value 10. According to an embodiment of the disclosure, the at least one input value 10 may include at least one of a target resolution difference for the AI down-scaler 1424 and the AI up-scaler 1444, a bitrate of the image data 25, a bitrate type of the image data 25 (for example, a variable bitrate type, a constant bitrate type, or an average bitrate type), a codec type for the transformation-based encoder 1426, output resolution for the pre-processor 1423, a network state, or performance of a display. The at least one input value 10 may include a value pre-stored in the apparatus 20 or a value input from a user.

The configuration controller 1422 controls operations of the pre-processor 1423, the AI down-scaler 1424, and the transformation-based encoder 1426, based on the received input value 10.

According to an embodiment of the disclosure, the configuration controller 1422 determines the output resolution according to the received input value 10, and sets the pre-processor 1423 with the determined output resolution. According to an embodiment of the disclosure, the configuration controller 1422 may transmit the received input value 10 to the pre-processor 1423, and the pre-processor 1423 may determine the output resolution for changing the resolution of the first original image 105, based on the received input value 10.

The configuration controller 1422 obtains DNN setting information for the AI down-scaler 1424 according to the received input value 10, and sets the AI down-scaler 1424 with the obtained DNN setting information. According to an embodiment of the disclosure, the configuration controller 1422 may transmit the received input value 10 to the AI down-scaler 1424 and the AI down-scaler 1424 may obtain the DNN setting information for performing AI down-scaling on the second original image 115 pre-processed by the pre-processor 1423, based on the received input value 10. According to an embodiment of the disclosure, the configuration controller 1422 may provide, to the AI down-scaler 1424, additional information, for example, color format (luminance component, chrominance component, red component, green component, or blue component) information to which AI down-scaling is applied and tone mapping information of a high dynamic range (HDR), together with the input value 10, and the AI down-scaler 1424 may obtain the DNN setting information in consideration of the input value 10 and the additional information.

According to an embodiment of the disclosure, the configuration controller 1422 transmits at least a part of the received input value 10 to the transformation-based encoder 1426, and thus the transformation-based encoder 1426 performs first encoding on the first image 125 via a bitrate of a certain value, a bitrate of a certain type, and a certain codec.

The pre-processor 1423 receives the first original image 105, and performs pre-processing of changing the resolution of the first original image 105 according to the output resolution. The AI down-scaler 1424 receives the second original image 115 and performs an operation described with reference to at least one of FIG. 1A, 1B, 10, 7, or 8 to obtain the first image 125.

According to an embodiment of the disclosure, the AI data 30 is provided to the apparatus 40. The AI data 30 may include at least one of resolution difference information between the second original image 105 and the first image 125, or information related to the first image 125. The resolution difference information may be determined based on the target resolution difference of the input value 10, and the information related to the first image 125 may be determined based on at least one of a target bitrate, the bitrate type, or the codec type. According to an embodiment of the disclosure, the AI data 30 may include parameters used during the AI up-scaling. The AI data 30 may be provided from the AI down-scaler 1424 to the apparatus 40.

The image data 25 is obtained as the first original image 105 is processed by the transformation-based encoder 1426, and is transmitted to the apparatus 40. The transformation-based encoder 1426 may process the first image 125 according to MPEG-2, H.264 AVC, MPEG-4, HEVC, VC-1, VP8, VP9, or VA1.

A configuration controller 1442 controls operations of the pre-processor 1443 and the AI up-scaler 1444. According to an embodiment of the disclosure, the configuration controller 1442 determines an output resolution, and sets the pre-processor 1443 with the determined output resolution. The pre-processor 1443 performs pre-processing of changing the resolution of the second image 145 based on the set output resolution. According to an embodiment of the disclosure, the configuration controller 1442 or the pre-processor 1443 may determine the output resolution, based on the resolution of an image reproducible by a display connected to the apparatus 40.

The configuration controller 1442 controls the operation of the AI up-scaler 1444, based on the AI data 30. According to an embodiment of the disclosure, the configuration controller 1442 obtains DNN setting information for the AI up-scaler 1444 according to the received AI data 30, and sets the AI up-scaler 1444 with the obtained DNN setting information. According to an embodiment of the disclosure, the configuration controller 1442 may transmit the received AI data 30 to the AI up-scaler 1444, and the AI up-scaler 1444 may obtain the DNN setting information for performing AI up-scaling on the third image 155, based on the AI data 30. According to an embodiment of the disclosure, the configuration controller 1442 may provide, to the AI up-scaler 1444, additional information, for example, the color format (luminance component, chrominance component, red component, green component, or blue component) information to which AI up-scaling is applied, and the tone mapping information of an HDR, together with the AI data 30, and the AI up-scaler 1444 may obtain the DNN setting information in consideration of the AI data 30 and the additional information. According to an embodiment of the disclosure, the AI up-scaler 1444 may receive the AI data 30 from the configuration controller 1442, receive at least one of prediction mode information, motion information, or quantization parameter information from the transformation-based decoder 1446, and obtain the DNN setting information based on the AI data 30 and at least one of the prediction mode information, the motion information, or the quantization parameter information.

The transformation-based decoder 1446 processes the image data 25 to reconstruct the second image 145. The transformation-based encoder 1446 may process the image data 25 according to MPEG-2, H.264 AVC, MPEG-4, HEVC, VC-1, VP8, VP9, or AV1.

The AI up-scaler 1444 obtains the fourth image 165 by performing AI up-scaling on the third image 155 provided from the pre-processor 1443, based on the set DNN setting information.

The AI down-scaler 1424 includes a first DNN and the AI up-scaler 1444 may include a second DNN. According to an embodiment of the disclosure, DNN setting information for the first DNN and second DNN are trained according to the training method described with reference to FIGS. 9 and 10. According to an embodiment of the disclosure, the DNN setting information for the first DNN and second DNN may be trained according to the training methods described above with reference to FIGS. 11, 12, and 13.

Table 1 below shows effects when AI encoding and AI decoding are performed on the first original image 105 according to an embodiment of the disclosure and when encoding and decoding are performed on the first original image 105 via HEVC.

TABLE 1

| Content | Resolution | Frame Number | Information Amount (Bitrate) (Mbps) | | Subjective Image Quality Score (VMAF) | |
|---|---|---|---|---|---|---|
| | | | HEVC | AI Encoding/ AI Decoding | HEVC | AI Encoding/ AI Decoding |
| Content_01 | 8K | 300 frames | 46.3 | 21.4 | 94.80 | 93.54 |
| Content_02 | (7680x4320) | | 46.3 | 21.6 | 98.05 | 98.98 |
| Content_03 | | | 46.3 | 22.7 | 96.08 | 96.00 |
| Content_04 | | | 46.1 | 22.1 | 86.26 | 92.00 |
| Content_05 | | | 45.4 | 22.7 | 93.42 | 92.98 |
| Content_06 | | | 46.3 | 23.0 | 95.99 | 95.61 |
| | | Average | 46.11 | 22.25 | 94.10 | 94.85 |

As shown in Table 1, even when a subjective image quality when AI encoding and AI decoding are performed on content including 300 frames of 8 K resolution according to an embodiment of the disclosure is higher than a subjective image quality when encoding and decoding are performed via HEVC, a bitrate is reduced by at least 50%.

The above-described embodiments of the disclosure can be written as computer-executable programs, and the written computer-executable programs can be stored in a medium.

The medium may continuously store the computer-executable programs, or temporarily store the computer-executable programs for execution or downloading. Also, the medium may be any one of various recording media or storage media in which a single piece or plurality of pieces of hardware are combined, and the medium is not limited to a medium directly connected to a computer system, but may be distributed on a network. Examples of the medium include a magnetic medium (e.g., a hard disk, a floppy disk, or a magnetic tape), an optical medium (e.g., a compact disk-read-only memory (CD-ROM) or a digital versatile disk (DVD)), a magneto-optical medium (e.g., a floptical disk), ROM, RAM, and a flash memory, which are configured to store program instructions. Other examples of the medium include recording media and storage media managed by application stores distributing applications or by websites, servers, and the like supplying or distributing other various types of software.

A model related to the above-described DNN may be implemented by using a software module. When the DNN model is implemented by using a software module (for example, a program module including instructions), the DNN model may be stored in a computer-readable recording medium.

The DNN model may be a part of the above-described AI decoding apparatus 200 or AI encoding apparatus 700 by being integrated in the form of a hardware chip. For example, the DNN model may be manufactured in the form of an exclusive hardware chip for AI, or may be manufactured as a part of an existing general-purpose processor (for example, a CPU or an AP) or a graphic-exclusive processor (for example, a GPU).

The DNN model may be provided in the form of downloadable software.

For example, a computer program product may include a product (e.g., a downloadable application) in the form of a software program that is electronically distributed through a manufacturer or an electronic market. For electronic distribution, at least a portion of the software program may be stored on a storage medium or may be created temporarily. In this case, the storage medium may be a server of the manufacturer or electronic market, or a storage medium of a relay server.

In AI ending and AI decoding methods and AI ending and AI decoding apparatuses all using pre-processing according to an embodiment of the disclosure, an image may be processed at a low bitrate via AI-based image encoding and AI-based image decoding.

However, effects attainable by the AI ending and AI decoding methods and the AI ending and AI decoding apparatuses all using pre-processing according to an embodiment of the disclosure are not limited to the aforementioned effects, and other effects not mentioned above will be clearly understood by one of ordinary skill in the art from the description below, The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A server for providing an image by using an artificial intelligence (AI), the server comprising:
    at least one processor configured to execute one or more instructions stored in the server to cause the server to:
    receive a first image;
    change a resolution of the first image to obtain a second image having a target resolution via a non-AI scaling method, wherein the target resolution is determined by applying, to a predetermined equation, a pre-determined output resolution of a third image to be output from a down-scaling neural network (NN) and a scaling factor of the down-scaling NN;
    after obtaining the second image via the non-AI scaling method, obtain the third image having the pre-determined output resolution by applying AI down-scaling based on the down-scaling NN to the second image;
    generate image data by performing encoding on the third image; and
    transmit the image data.

2. The server of claim 1, wherein the server is configured to:
    determine, as the target resolution of the second image, a value obtained by dividing the pre-determined output resolution by the scaling factor of the down-scaling NN; and
    change the resolution of the first image to have the determined target resolution.

3. The server of claim 1, wherein the down-scaling NN is trained based on first quality loss information corresponding to a difference between an up-scaled training image obtained by performing AI up-scaling on an original training image through an up-scaling NN and an enlarged training image obtained by performing non-AI up-scaling on the original training image.

4. The server of claim 3, wherein the down-scaling NN is trained based on second quality loss information corresponding to a difference between a down-scaled training image obtained by performing the AI down-scaling on the up-scaled training image through the down-scaling NN and the original training image.

5. The server of claim 1, wherein the server is configured to transmit AI data related to the AI down-scaling, and the AI data is used to select NN setting information to be set for an up-scaling NN for AI up-scaling from among a plurality of NN setting information previously stored in a display apparatus.

6. The server of claim 1, wherein the server is configured to determine the output resolution, based on performance information of a display that reproduces a decoded image obtained through decoding on the image data.

7. The server of claim 1, wherein the server is configured to determine the output resolution, based on a scaling factor of a display apparatus that performs AI up-scaling on a decoded image obtained through decoding on the image data and performance information of the display apparatus that reproduces an up-scaled image obtained through the AI up-scaling on the decoded image.

8. The server of claim 1, wherein the server is configured to, when a display apparatus is able to perform changing resolution of a decoded image obtained through decoding on the image data, determine the output resolution based on a state of a network that connects the server to the display apparatus.

9. A method for providing an image by using an artificial intelligence (AI), the method comprising:
receiving a first image;
changing resolution of the first image to obtain a second image having a target resolution via a non-AI scaling method, wherein the target resolution is determined by applying, to a predetermined equation, a pre-determined output resolution of a third image to be output from a down-scaling neural network (NN) and a scaling factor of the down-scaling NN;
after obtaining the second image via the non-AI scaling method, obtaining the third image having the pre-determined output resolution by applying AI down-scaling based on the down-scaling NN to the second image;
generating image data by performing encoding on the third image; and
transmitting the image data.

10. A non-transitory computer-readable recording medium having stored therein instructions for performing the method of claim 9.

* * * * *